(12) United States Patent
Martin

(10) Patent No.: US 8,322,649 B2
(45) Date of Patent: *Dec. 4, 2012

(54) SAUCER-SHAPED GYROSCOPICALLY STABILIZED VERTICAL TAKE-OFF AND LANDING AIRCRAFT

(76) Inventor: Herbert Martin, Paducah, KY (US)

( * ) Notice: Subject to any disclaimer, the term of this patent is extended or adjusted under 35 U.S.C. 154(b) by 397 days.

This patent is subject to a terminal disclaimer.

(21) Appl. No.: 12/804,011

(22) Filed: Jul. 9, 2010

(65) Prior Publication Data

US 2010/0320333 A1  Dec. 23, 2010

Related U.S. Application Data

(63) Continuation-in-part of application No. 12/387,770, filed on May 7, 2009, now Pat. No. 7,971,823.

(51) Int. Cl.
  *B64C 29/00* (2006.01)
  *B64C 39/00* (2006.01)

(52) U.S. Cl. ........................................ 244/23 C; 244/60

(58) Field of Classification Search ................. 244/12.2, 244/17.11, 23 R, 23 A, 23 B, 23 C, 34 A, 244/39, 60, 67, 73 B, 73 C See application file for complete search history.

(56) References Cited

U.S. PATENT DOCUMENTS

| | | | | |
|---|---|---|---|---|
| 2,835,073 A * | 5/1958 | Dame | ........................... | 244/12.2 |
| 2,997,254 A * | 8/1961 | Mulgrave et al. | ........... | 244/73 B |
| 3,062,482 A * | 11/1962 | Frost | ................................ | 244/15 |
| 3,410,507 A * | 11/1968 | Moller | ......................... | 244/23 C |
| 4,795,111 A * | 1/1989 | Moller | ......................... | 244/23 C |
| 6,050,520 A * | 4/2000 | Kirla | ............................. | 244/23 C |
| 7,249,732 B2 * | 7/2007 | Sanders et al. | .............. | 244/23 A |
| 7,896,630 B2 * | 3/2011 | Grisar et al. | .................. | 418/219 |
| 7,971,823 B2 * | 7/2011 | Martin | ......................... | 244/23 C |

* cited by examiner

*Primary Examiner* — Tien Dinh
*Assistant Examiner* — Richard R Green
(74) *Attorney, Agent, or Firm* — Stockwell & Smedley, PSC

(57) ABSTRACT

An aircraft that is housed within a gyroscope providing for improved flight stability that includes an inner hull which remains stationary within a rotating outer hull. A rotating plate includes a groove that traces a sinusoidal pattern around an inside periphery of the plate. Tracking arms have a portion that fit within the groove and another portion that connects to a piston. The rotation of the plate causes the tracking arms to travel within the sinusoidal groove and impart movement on the plurality of pistons which will intake air from above the upper surface of the inner hull configuration and create a negative pressure on the aircraft. The craft contains compression chambers which receive the air and which feed the various impeller thrusters which are rotational within three-fourths of a hemisphere.

20 Claims, 39 Drawing Sheets

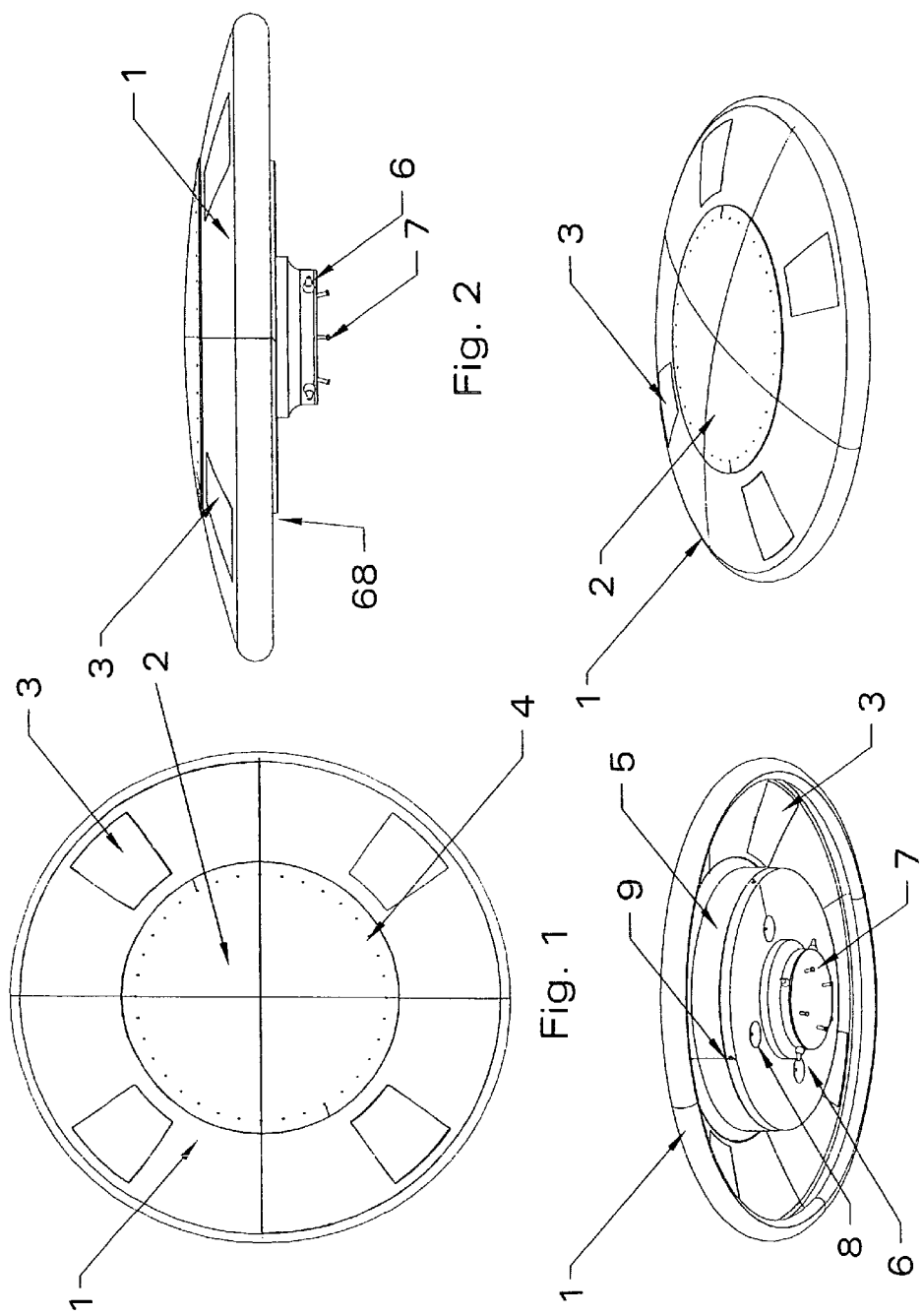

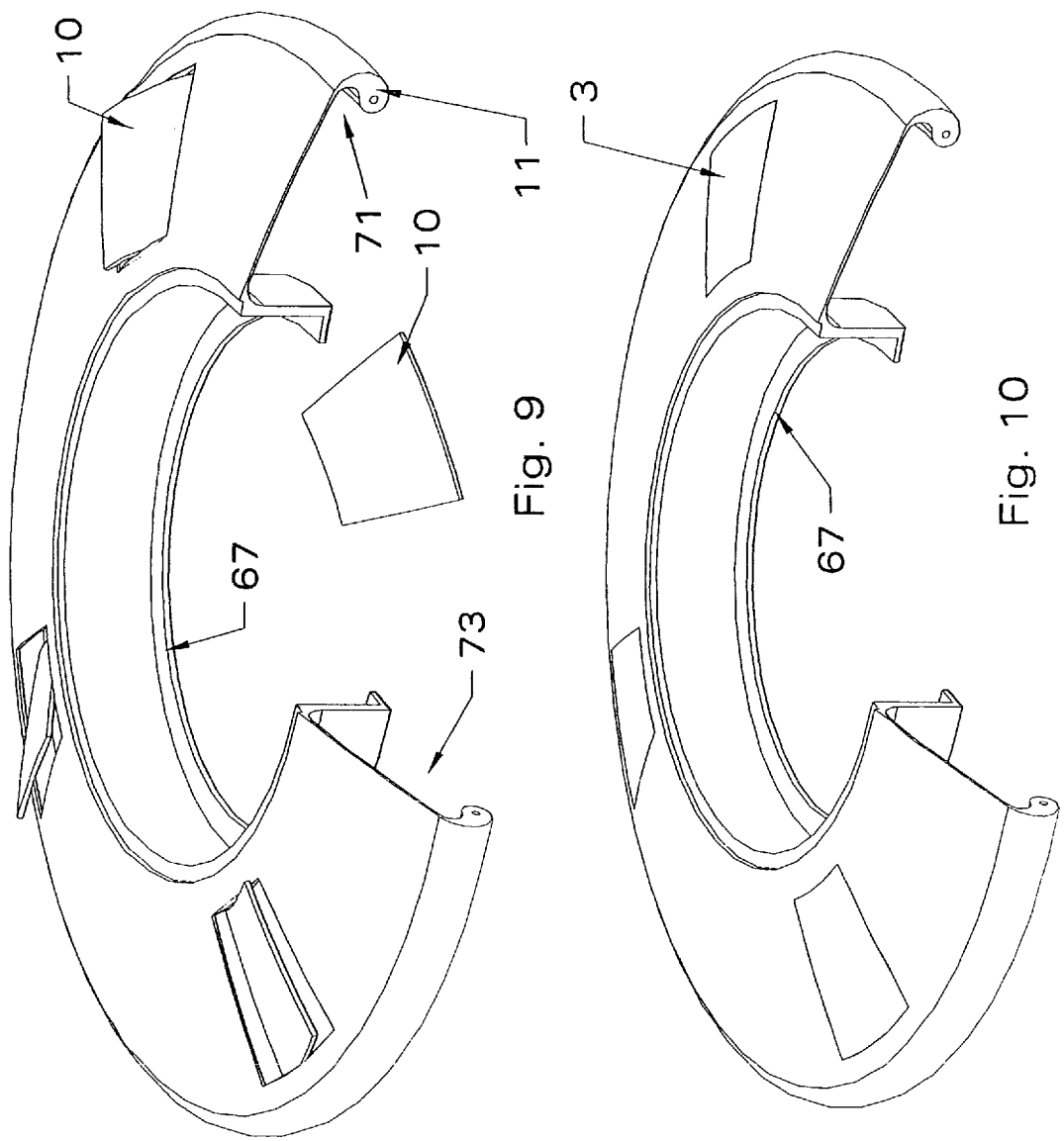

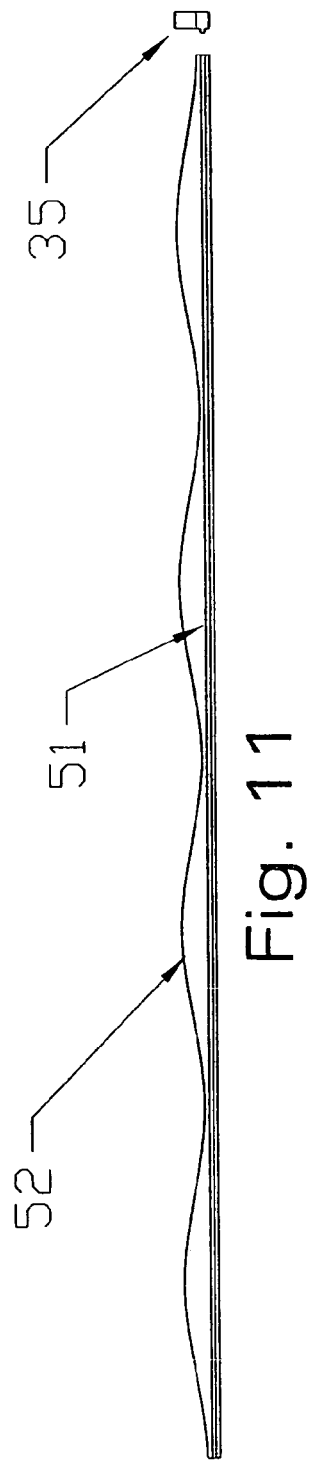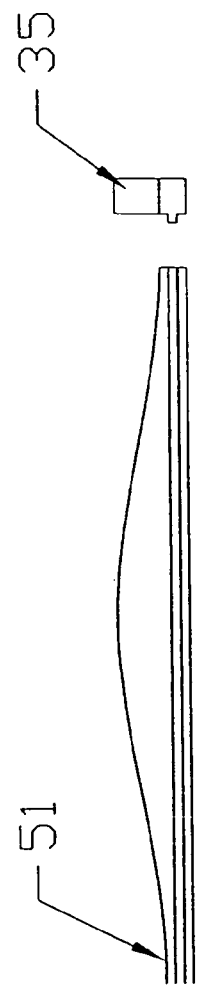

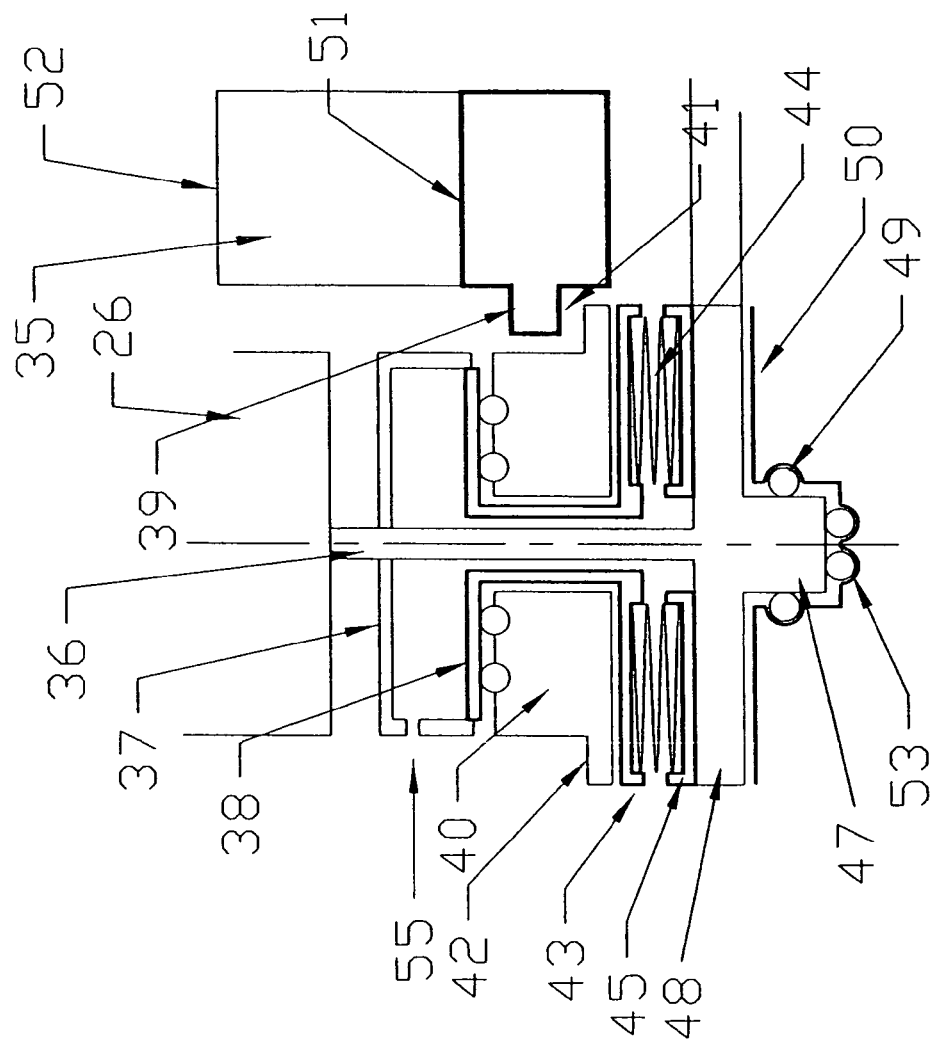

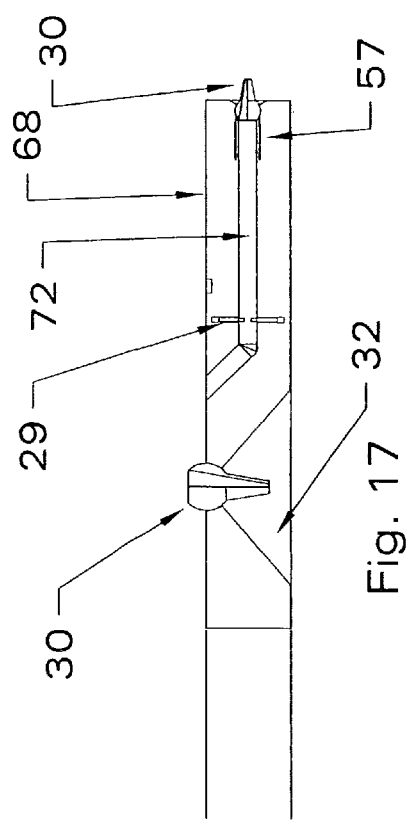
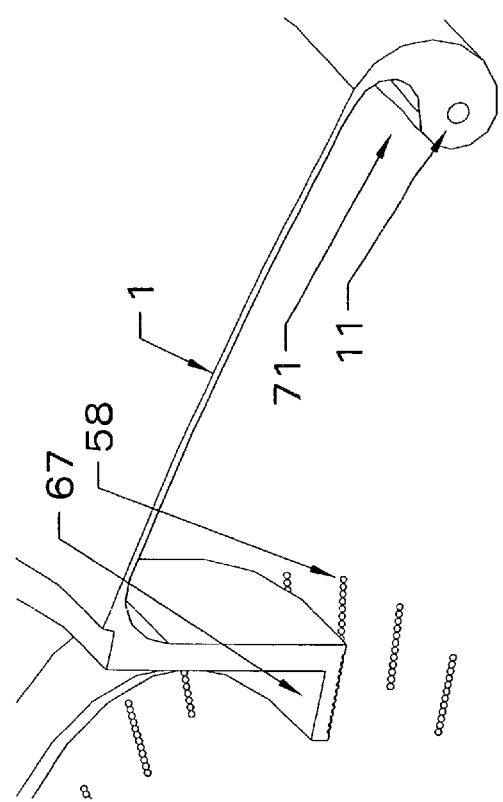

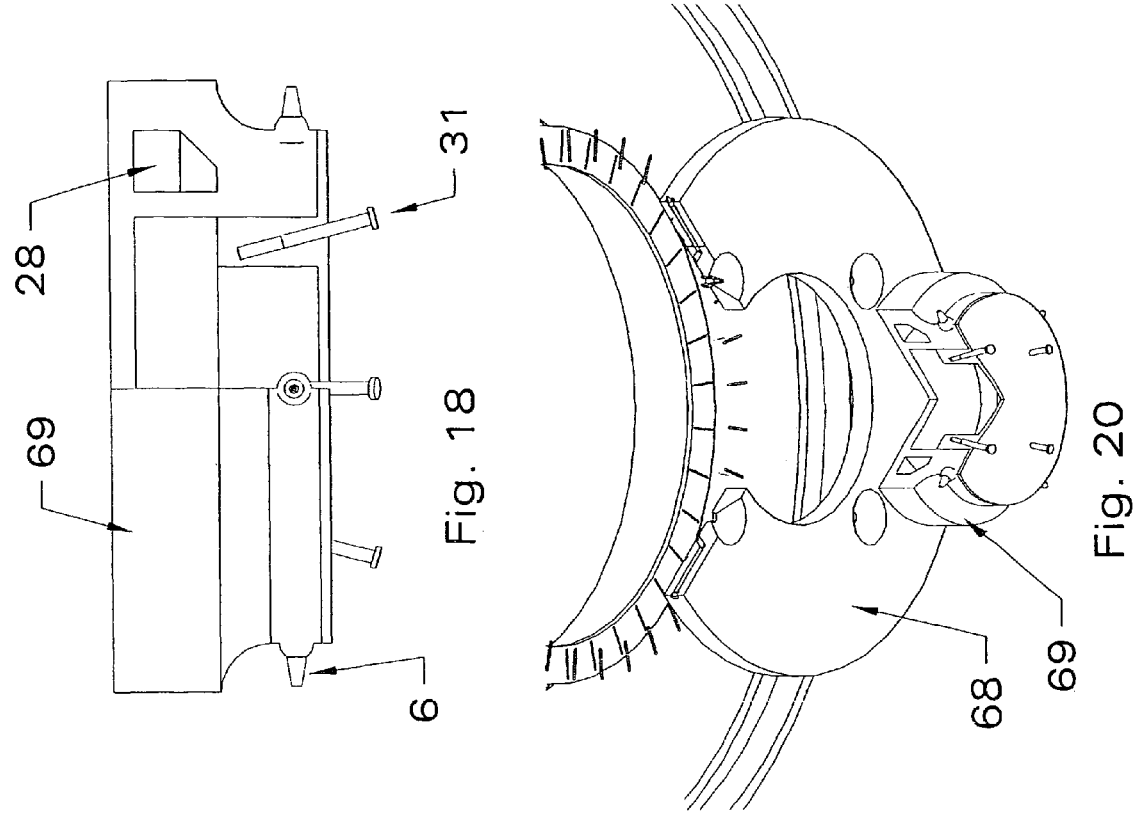

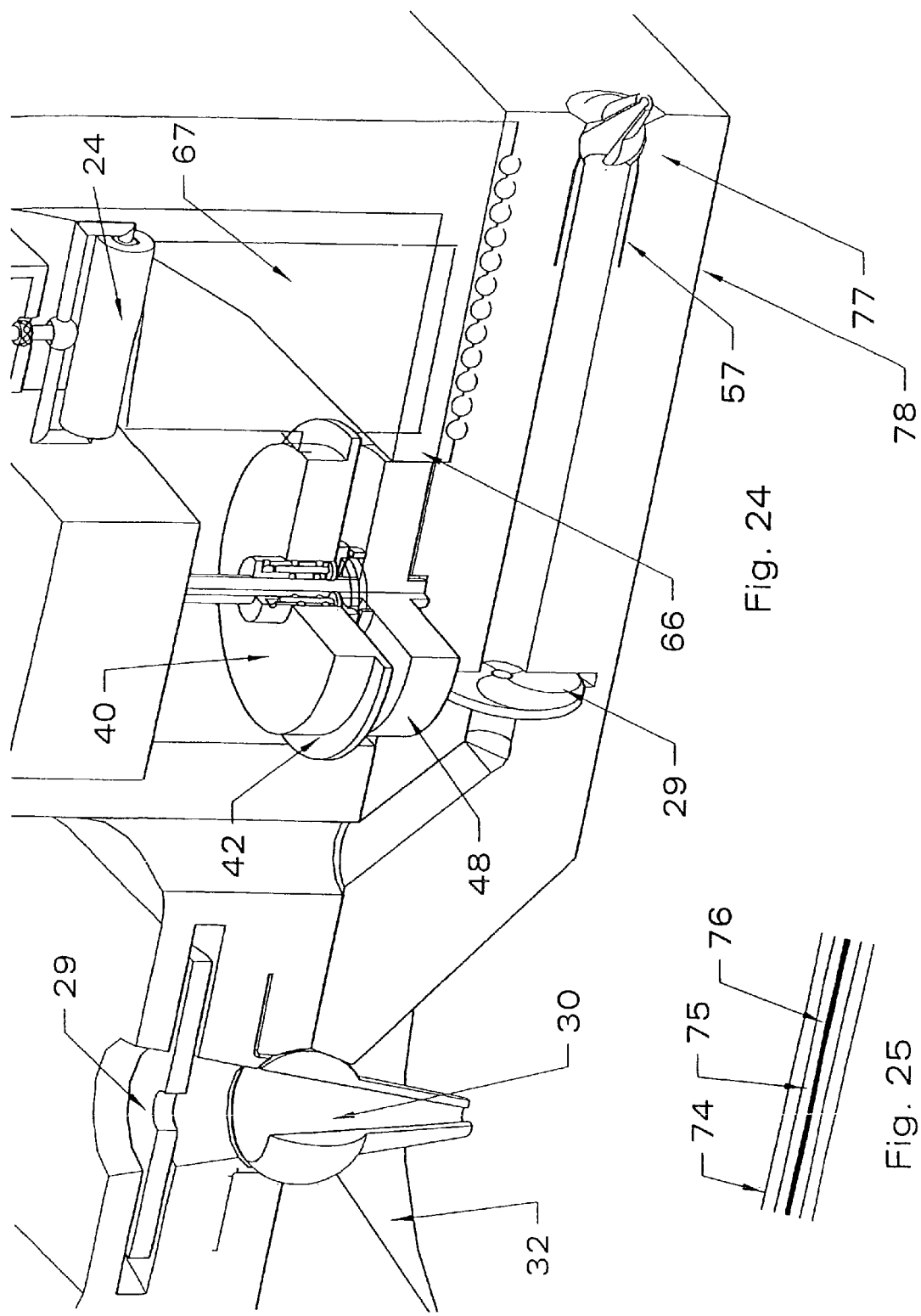

SAUCER-SHAPED GYROSCOPICALLY STABILIZED VERTICAL TAKE-OFF AND LANDING AIRCRAFT

RELATED APPLICATIONS

The present applications is a continuation-in-part of previously filed U.S. patent application Ser. No. 12/387,770 filed May 7, 2009, the contents of which are hereby incorporated by reference in their entirety.

FIELD OF THE INVENTION

The present invention relates to vehicles and more particularly to flying vehicles.

DESCRIPTION OF RELATED ART

With the current concerns over the polluting of the atmosphere, climatic change, and damage to the ozone layer, a critical look at and solution to the problems is necessary. Today jet planes fly higher than stratocumulus and altostratus clouds and spew polluting material at altitudes that are too high to be easily returned to Earth by rainfall, creating a permanent concealment of dirt that traps too much heat beneath its veil. Also, the intense heat from the rockets and other vehicles of various countries' space programs punch their way into outer space and continually burn off the ozone layer in their flight, inflicting damage that will last for many generations. Furthermore, millions of gallons of petroleum products are burned up daily with the prospect of depleting the world supply within this century becoming a real possibility with little thought being given to alternative fuels and alternative methods for air travel. There is an unmet need for a method to slip through the atmosphere and into outer space rather than blasting through it. There is also a need for a method to travel around the world without leaving a trail of pollution in the wake. Furthermore, considering the threat of terrorism around the globe, a method of surveillance that is small, remote-controlled, quiet, and does not crawl on the ground would be useful as well. There is also a need for a device that can effectively maneuver through an ongoing disaster area to perform human rescue attempts; as well as a need for a device that can remain aloft for extended periods of time in order to effectively vacuum the upper atmosphere and replenish the ozone layer while improving a polluted Earth to a better condition.

The ability to lift off vertically from the ground, hover above the ground, and move in translational flight with the ground currently exists with helicopters, Harrier jet planes, and hovercraft. Included among a long list of such craft are the VZ-9-Av Avrocar, U.S. Pat. No. 3,062,482, Moller's M200x flying saucer, U.S. Pat. No. 3,410,507 which used multiple engines, and the Aerobots described in U.S. Pat. No. 4,795,111 which used a single fan and up to eight ducted fans powered by rotary engines. The Bombadier CL-327 Guardian VTOL,UAV featured dual, coaxial, contra-rotating rotors, the concept of which is now being sold in a children's toy. The electric motor of the AROD was ground supplied with generation and thereby tethered limiting the flight radius. Notably, a VTOL hover platform by Sanders, U.S. Pat. No. 7,249,732 uses battery power or fuel cell technology to power the engines of a surveillance device, but it contains no technology that is new nor different from that of a helicopter.

BRIEF SUMMARY OF THE INVENTION

Embodiments of the present invention relate to a system and device that addresses at least some of the above-identified needs with a airborne vehicle as described in detail herein. By varying the size and sophistication of the vehicle, embodiments of the present invention can be adapted to fulfill many, if not all, the above-identified needs.

It is understood that other embodiments of the present invention will become readily apparent to those skilled in the art from the following detailed description, wherein it is shown and described only various embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF DRAWINGS

Various aspects of the invention are illustrated by way of example, and not by way of limitation, in the accompanying drawings, wherein:

FIG. 1 is a top view of embodiments of the present invention showing the outer rotating gyroscopic hull with the air foil propellers positioned within the plane of the hull and the inner stationary hull with the air intake openings.

FIG. 2 is a front view of embodiments of the present invention showing the outer rotating gyroscopic hull with the air foil propellers positioned within the plane of the hull, the inner stationary hull with the air intake openings, the exterior shell of the compression chamber showing the lift and propulsion thrusters, and the retractable landing legs:

FIG. 3 is a top perspective view of embodiments of the present invention showing the outer rotating gyroscopic hull with the air foil propellers positioned within the plane of the hull and the inner stationary hull with the air intake openings.

FIG. 4 is an underside perspective view of the embodiments of the present invention showing the outer rotating, disk-shaped, gyroscopic hull with the air foil propellers positioned within the plane of the hull and the inner stationary hull showing the exterior shell of the compression chamber with the lift thrusters, the rotation stabilization and direction maneuvering thrusters, the propulsion thrusters and showing the retractable landing legs.

FIG. 9 is a cut-away perspective view of the outer rotating gyroscopic hull with the air foil propellers tilted into a lift position.

FIG. 10 is a cut-away perspective view of the outer rotating gyroscopic hull with the air foil propellers positioned within the embodiment of the hull.

FIG. 11 is a stretch-out view of the sine-wave ring with a rotated section.

FIG. 12 is a stretch-out view of one cycle of the sine-wave ring with a rotated section.

FIG. 13 is a section view of the sine-wave ring showing the lower drive wheel and the upper drive wheel not in contact with the sine-wave ring.

FIG. 17 is an enlarged section of a lift thruster and a directional guidance and rotational stabilization thruster.

FIG. 18 is an enlarged section of the annular compression chamber and the landing legs.

FIG. 19. is an enlarged section of the embedded annular gyroscopic stabilizer and the roller bearing ring.

FIG. 20. is an underside pictorial showing the lift thrusters, the directional guidance and rotation stabilization thrusters, the propulsion thrusters, and the roller bearing ring.

FIG. 24 is an enlarged pictorial of the upper and lower drive wheels and the directional thruster rotated into a counter-clockwise turning position.

FIG. 25 is a cross section of the multiple laminated hull skin.

DETAILED DESCRIPTION OF INVENTION

Figure 5:
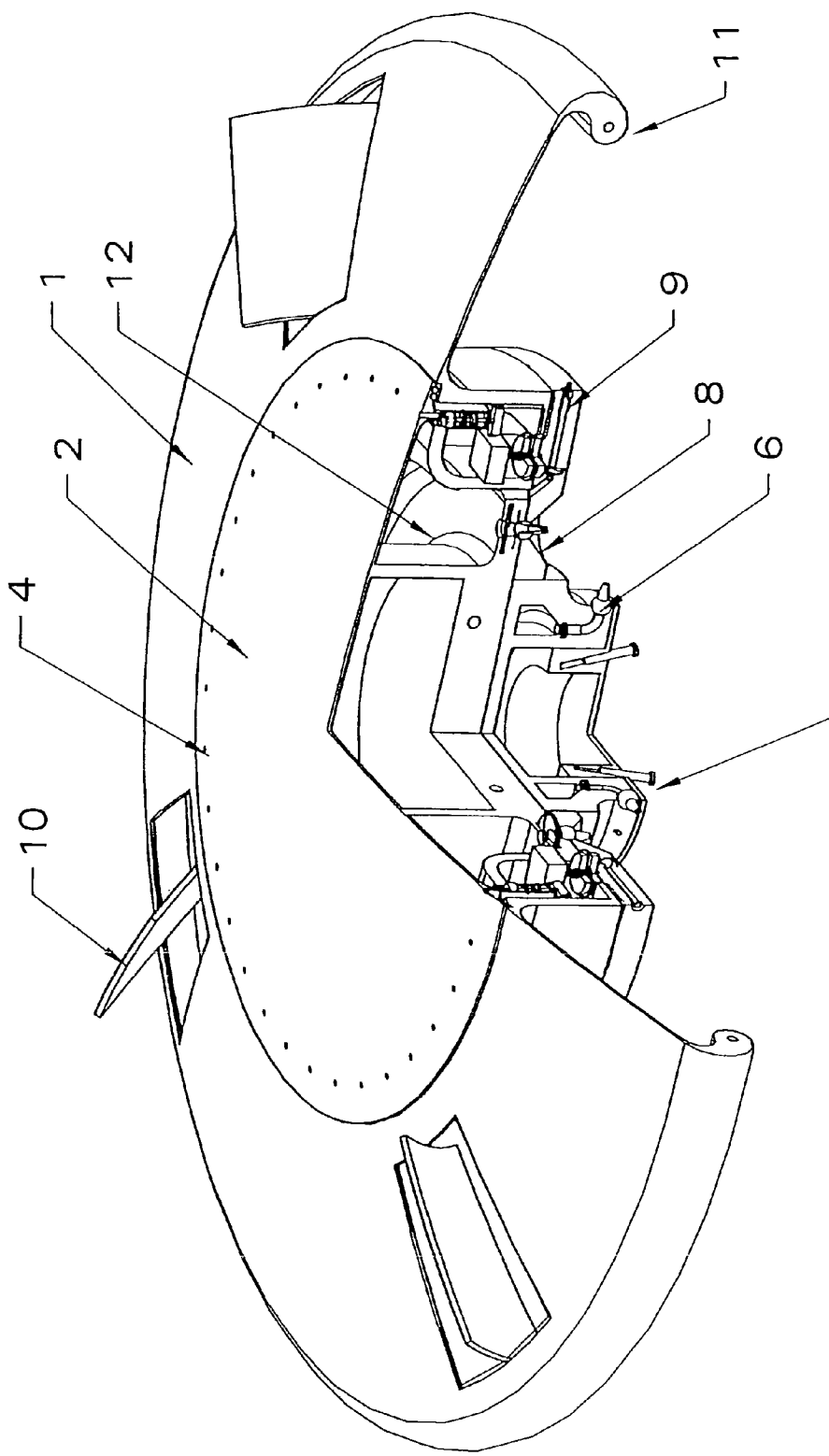
FIG. 5 is a cut-away perspective view of the entire assembly with the air foil propellers tilted into a lift position.
Figures 6, 7:
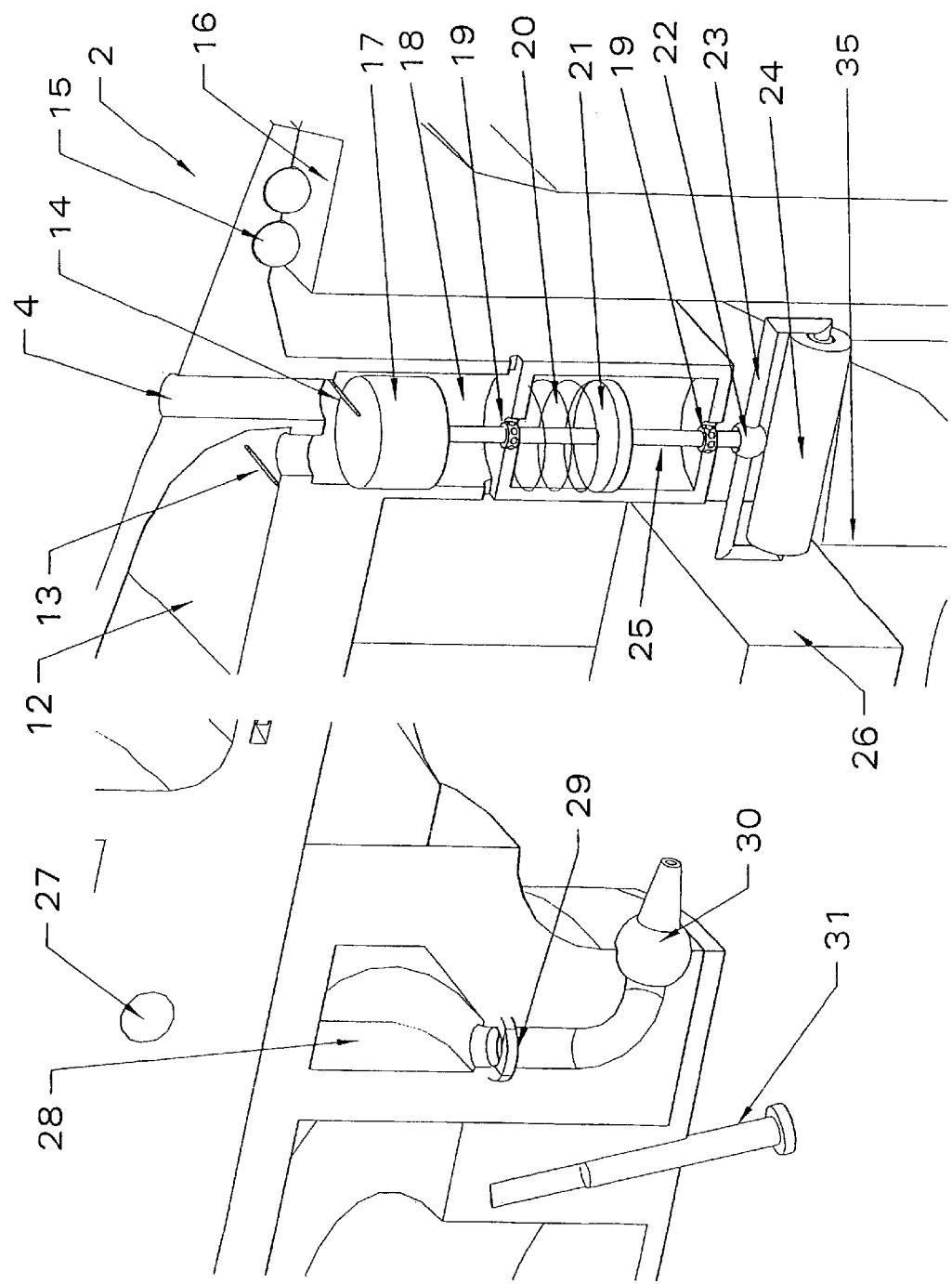
FIG. 6 is a cut-away pictorial showing the propulsion thruster.
FIG. 7 is a cut-away pictorial showing the piston-roller assembly.

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

Embodiments of the present invention relate to an aircraft that is housed entirely within a gyroscope providing the improved flight stability. It introduces the new concept of a sine-wave ring that is used to activate a plurality of pistons which will intake air from above the upper surface of the inner hull configuration and create a negative pressure on the aircraft. The craft contains compression chambers which feed the various impeller thrusters which are rotational within three-fourths of a hemisphere. The rotational stabilization thrusters which exhaust in a direction contrary to the rotation of the gyroscopic hull will be employed constantly during flight and are used to counterbalance the rotational effect on the inner body so that only the outer gyroscopic hull is rotating. The directional guidance thrusters are used to rotate the aircraft in either a clockwise or counterclockwise direction based on the need for a change of direction during flight. The lift thrusters are used to relieve excess pressure in the compression chambers and to provide lift while the air foils are positioned within and flush with the rotating outer hull. The propulsion thrusters are used to propel the aircraft in any direction and can be used for forward movement or for stopping movement in order to hover while in flight. Varying, by increasing or lessening, the exhaust pressure on the individual lift thrusters around the aircraft can alter the angle of inclination of the entire craft thereby, when used in conjunction with the propulsion thrusters, can propel the aircraft into an ascension or descent mode as desired. Safety pressure relief devices are installed in the thrusters to prevent excess pressure buildup in the compression chamber as well as releasing the pressure plate connector that drives the sine-wave ring. Electric power from high-capacity batteries may be used to drive the motors that power the sine-wave ring and the gyroscopic hull, and this power may, beneficially, be replenished by a device that captures solar energy. Although it is the intent of this invention to provide a quiet, non-polluting method of flight, it is also not the intent that the claims of the invention be restricted to only these ideals. Alternatively, the motors may also be powered by more conventional means, and if more rapid flight is desired, the rear propulsion thrusters, allowing for a modification of the design, may be jet propelled or rocket propelled that would allow for terrestrial and extra-terrestrial travel.

According to embodiments, a saucer-shaped aircraft employs a rotary outer disk configuration containing a perimeter toroid with an embedded annular weight to function as a gyrostabilizer for the entire craft. Also contained within the saucer-body contour, a plurality of rotational adjustable air foils function as lift-off propellers when the outer disk, the base rim of which rests on a flat cylindrical surface containing a plurality of ball bearings, is rotating around a vertical axis central to the entire shape. The air foils are rotational along an axis coincident with radial lines emanating from the central axis and within the curved plane of the outer disk hull and are primarily used for liftoff or to maintain altitude when the aircraft is excessively loaded, the amount of lift being determined by the angle of inclination.

When altitude has been achieved and the air foils are no longer needed to remain aloft, the air foils are rotated into the plane of the outer hull creating a gravity resistant air pressure, similar to the function of a parachute, which helps to stabilize the aircraft and reduce wind resistance.

The rotary outer disk is driven by pressure coupling clutches or cylindrical gears turned by a multiplicity of three or more equally spaced electric, battery driven motors that are precisely located to maintain the balance and stability of the aircraft. These motors are also used with pressure contacts to drive a sine-wave ring assembly sharing the common, vertical, central axis and resting on the upper ball-bearing surface of a lip on the rotary outer disk. The sine-wave ring, when it rotates, drives a multiplicity of piston assemblies connected to the fixed inner disk which contains a plurality of air intake holes creating a negative pressure on the upper surface when air is sucked into the holes, and this air is then exhausted into a multi-compartmentalized compression chamber with the air pressure from the compartments being used to drive at least three pluralities of multi-directional, airscrew-impeller thrusters (A. Lift thrusters, B. Directional guidance and rotation stabilization thrusters, and C. Propulsion thrusters).

The multiplicity of multidirectional lift thrusters are primarily directed downward and are used for lift especially when the air-foil propellers are in a closed position within the outer hull. The directional guidance thrusters are used to turn the air craft rotationally in circular directions around the vertical central axis, and the rotational stabilization thrusters are used to counterbalance the rotational gyroscopic effect of the rotating outer hull. The multidirectional propulsion thrusters are used to propel the aircraft primarily forward but also rearward or sideways in any desired direction. The size of the aperture openings controls the amount of compressed air released into the impellers and thereby controls the jet propulsion action needed by the thrusters to attain proper lift, turn, and speed. Retractable legs permit the aircraft to land without impeding the rotational movement of the outer saucer body. Since no carbon fuels are used, little or no pollution is introduced into the atmosphere, and removable air filters are embedded in the compressed air chambers thereby filtering and cleaning existing air through which the aircraft travels.

Below is a legend table for the elements depicted in FIGS. 1-26. Functional names and labels have been given to each element but are not intended to limit these elements to only these functions but rather to aid the reader in understanding embodiments of the present invention.

| # | Element |
|---|---|
| 1. | Outward Rotating Hull |
| 2. | Inward Stationary Hull |
| 3. | Air Foil Propellers, Closed |
| 4. | Air Intake Openings |
| 5. | Vertical leg of rotating outward hull |
| 6. | Propulsion Thruster |
| 7. | Retractable Leg |

-continued

| # | Element |
|---|---|
| 8. | Lift Thruster |
| 9. | Directional and Stabilization Thruster |
| 10. | Air Foil Propellers, Open |
| 11. | Imbedded Annular Weight |
| 12. | Interior of Compression Chamber |
| 13. | Flexible Flap for Piston Exhaust Into Compression Chamber |
| 14. | Flexible Flap for Piston Intake of Outside Air |
| 15. | Ball Bearing Ring for Inward/Outward Hulls |
| 16. | Bearing Surface of Outward Rotating Hull |
| 17. | Piston Assembly |
| 18. | Piston Chamber |
| 19. | Ring Bearing |
| 20. | Piston Spring |
| 21. | Piston Spring Flange |
| 22. | Ball and Socket for Rocker Arm |
| 23. | Rocker Arm |
| 24. | Piston Roller |
| 25. | Piston Rod |
| 26. | Motor |
| 27. | Annular Tube Feeder for Propulsion Thrusters |
| 28. | Compression Chamber for Propulsion Thrusters |
| 29. | Aperture Opening for Propulsion Thrusters |
| 30. | Ball and Socket Rotational Air Screw Fan Impeller thruster |
| 31. | Retractable Landing Leg |
| 32. | Cone recess in annular lower plate |
| 33. | Sine-wave ring |
| 34. | Connecting rod to lower drive wheel |
| 35. | Pressure relief compression chamber housing |
| 36. | Moveable compressor |
| 37. | Projection lip on sine-wave ring |
| 38. | Upper drive wheel |
| 39. | Projection lip on sine-wave ring |
| 40. | Upper drive wheel |
| 41. | Gap when upper drive wheel is not in contact with sine-wave ring |
| 42. | Contact flange on upper drive wheel |
| 43. | Lower surface of moveable compressor |
| 44. | Compression spring compressed |
| 45. | Lower housing for compression spring |
| 46. | Closed gap when upper drive wheel is in contact with sine-wave ring |
| 47. | Base spindle for lower drive wheel |
| 48. | Lower drive wheel |
| 49. | Side bearings for base spindle |
| 50. | Upper surface of lower plate |
| 51. | Sine-wave ring base (nadir) |
| 52. | Sine-wave ring crest (zenith, apogee) |
| 53. | Spindle base bearings |
| 54. | Compression spring not compressed |
| 55. | Pressurized air intake into pressure relief compression chamber |
| 56. | Non-pressurized air intake into pressure relief compression chamber |
| 57. | Directional controls for impeller thruster |
| 58. | Annular roller bearing ring imbedded in lower plate |
| 59. | Compressed air tube leading to propulsion thruster |
| 60. | Battery or fuel storage compartment |
| 61. | Outer surface of lower plate |
| 62. | Optional removable filtering system |
| 63. | Circular base of sine-wave ring |
| 64. | Center axis of craft |
| 65. | Upper boundary line of piston assembly movement |
| 66. | Friction or gear connection between lower drive wheel and outer rotating hull |
| 67. | Support arm for outward rotating hull |
| 68. | Lower plate |
| 69. | Housing for fuel storage, retractable legs, and propulsion thrusters |
| 70. | Friction or gear edge on support arm for outer rotating hull |
| 71. | Trapped air cavity for sustaining lift |
| 72. | Compressed air tube leading from aperture to directional thruster |
| 73. | Disk-shaped (Frisbee) shaped hull |
| 74. | Clear fiberglass layer of skin laminate |
| 75. | Kevlar layer of skin laminate |
| 76. | Titanium mesh layer of skin laminate |
| 77. | Directional thruster rotated |
| 78. | Lift thruster base plate |
| 79. | Vertical leg of stationary inward hull |

-continued

| 80. | Base Plate |
| 81. | Roller bearing for upper drive wheel |

As mentioned earlier, embodiments of the present invention relate to a saucer-shaped aircraft as illustrated FIGS. 1, 2 3, and 4. In FIG. 1, a plan view of the present invention and in FIG. 3, a top perspective view, it is illustrated that there exists an outward hull (1) and an inward hull (2) which comprise the basic overall saucer shape of the aircraft. As readily apparent the shape resembles that of a Frisbee® or other throwing disks. The outward hull is designed to be rotational and provide gyroscopic stability to the craft while the inward hull is stationary, which is beneficial if the aircraft is to be passenger bearing. The direction of rotation for the outward hull will necessarily depend upon the hemisphere in which the travel is being conducted, a clockwise direction in the Northern hemisphere and a counterclockwise direction in the Southern hemisphere. In order to provide ground clearance for the rotating outer hull, retractable legs (7) are imbedded in the base of the aircraft and will be in a hidden, retracted position during flight so as to not create drag. Positioned within the plane of the outward hull (1) are a multiplicity of air foil propellers (3) and in this closed position, they are designed to, along with the rest of the hull create a resistance to descent by compressing the outside air underneath its umbrella, mimicking a parachute.

Figure 15:
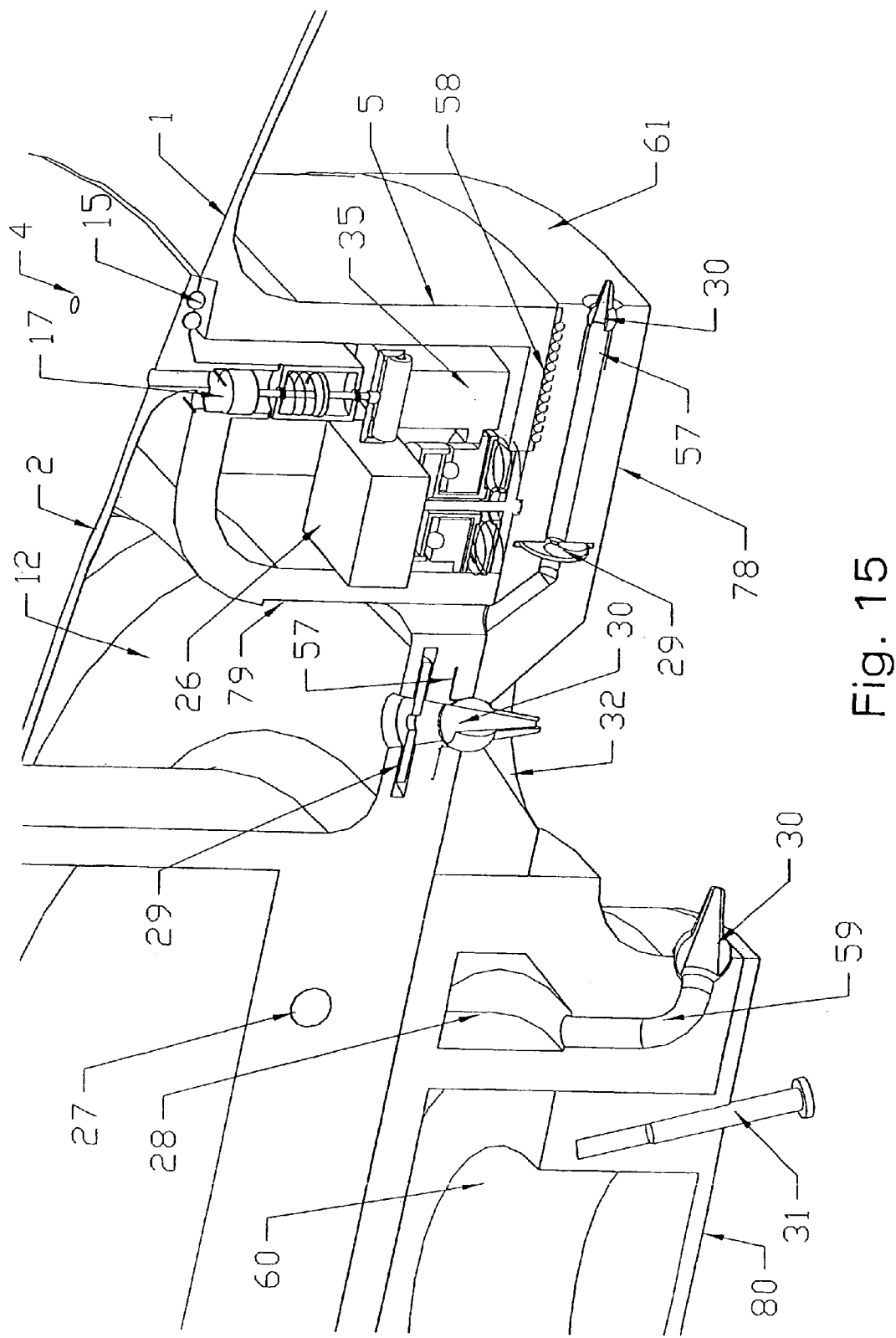
FIG. 15 is an enlarged cut-away pictorial of the compression drive assembly.
Figure 22:
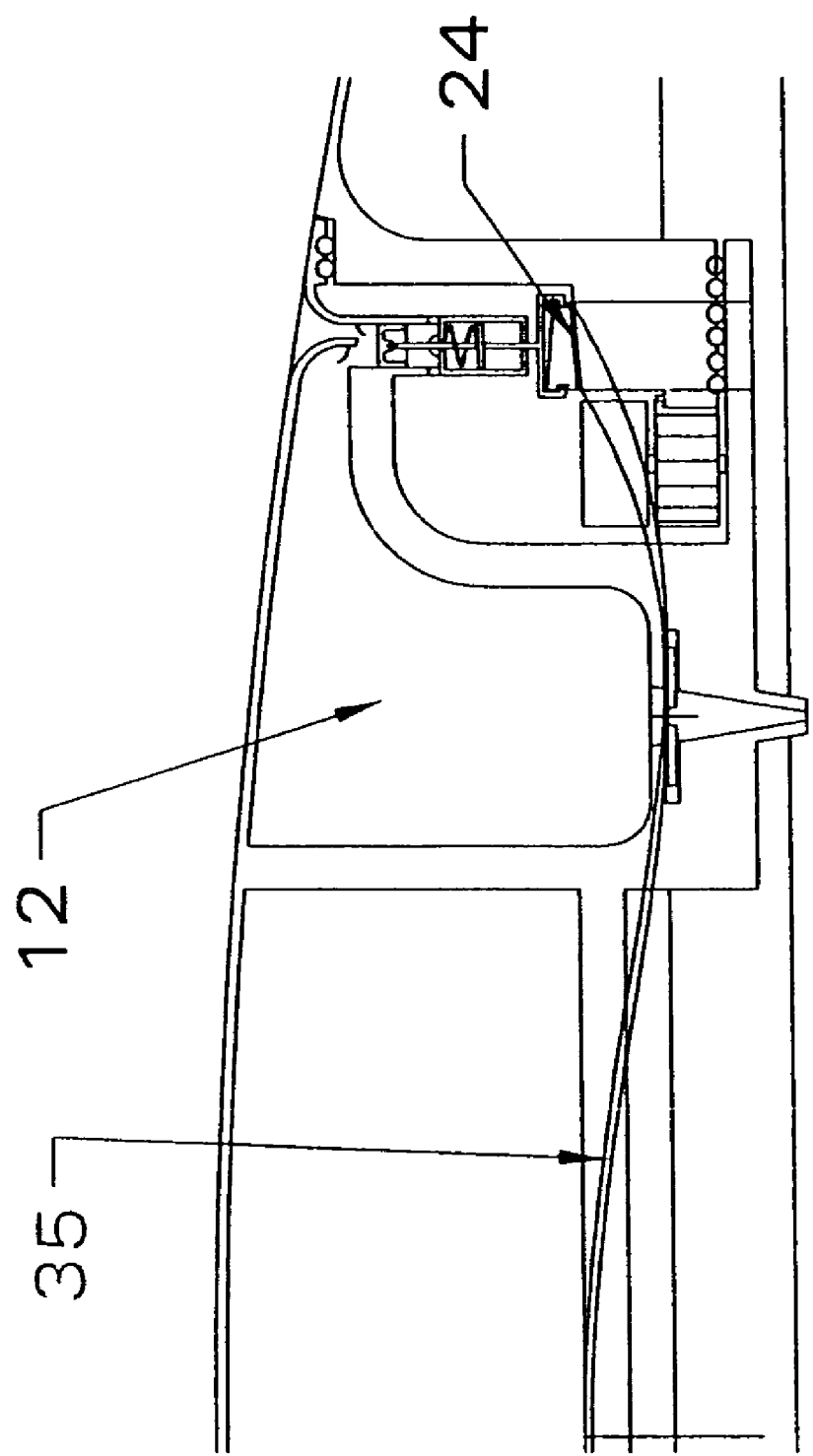
FIG. 22 is an enlarged view showing the relative working positions of the sine-wave ring and the piston roller assembly.
Figure 23:
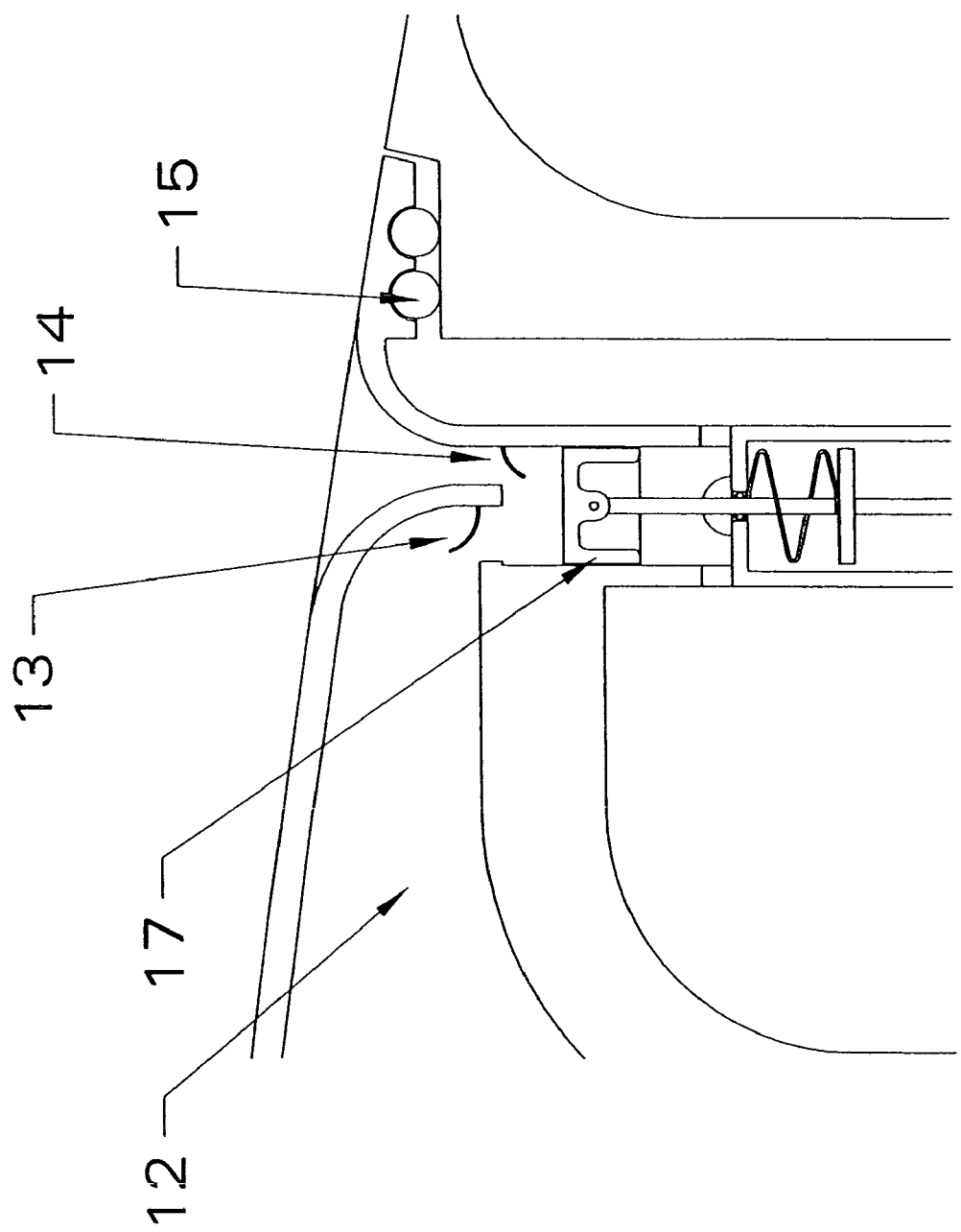
FIG. 23 is an enlarged view showing the flexible flap for piston intake of outside air and the flexible flap for piston exhaust of air into the compression chamber.
Figure 26:
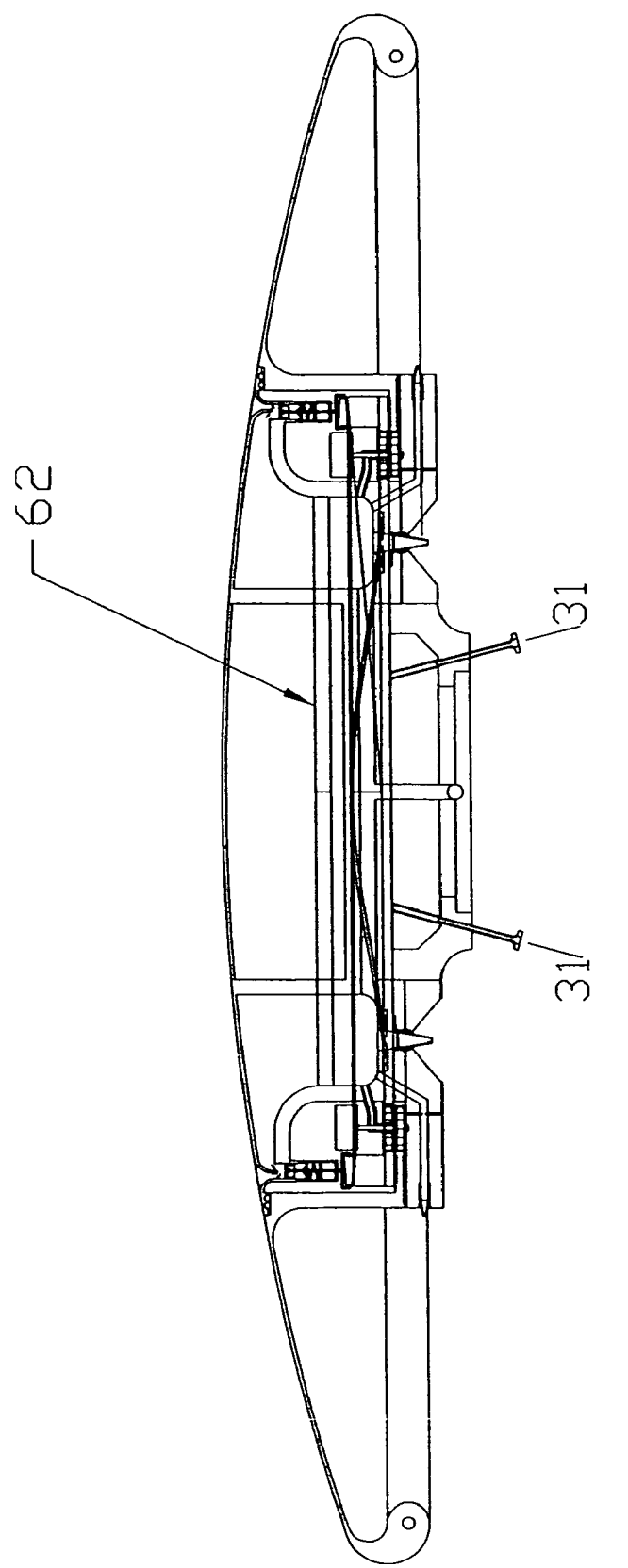
FIG. 26 is a cut-away view of the aircraft depicted in FIG. 2.

Imbedded in the inward hull (2) are a plurality of air intake ports (4) which are designed to rapidly draw air from the atmosphere into a compression chamber (12), see FIGS. 15 and 22, and this sucking of air creates a negative pressure on the upper surfaces of the inward and outward hulls creating a tendency toward an upward pull on the entire aircraft. Compressed air within the chamber (12) is allowed to be released through an evenly spaced plurality of downward facing lift thrusters (8) which create the tendency to push the aircraft upward thereby, in conjunction with the negative pressure, achieving flight.

As shown in FIG. 5, compressed air from within the chamber (12), will be exhausted through the directional and stabilization thrusters (9) and air will constantly flow through these when the outward hull is rotating and will blow in a direction opposite to that of the hull in order to prevent rotation of the inward hull. Additionally, the greatest quantity of compressed air will be forced through the propulsion thruster (6) and will propel the aircraft forward or backwards.

If at any time during takeoff, flight, or landing, additional lift for the aircraft is needed, it may be provided by adjusting the attitude of the air foil propellers (10) shown in FIG. 5 and FIG. 9, by rotating them along a radial axis line originating from the central axis (64) (see FIG. 8) of the aircraft and traveling along the surface of the outward hull.

Primarily, embodiments of the present invention are designed to be flown with the air foil propellers in a closed position (3) as shown in FIG. 10. Within the embodiments of this invention and consistent with the outer ring of the outer hull is an imbedded annular weight (11) (see FIGS. 9 and 19) which may be composed of stranded stainless steel wires, which serves to function as a gyroscope for the entire aircraft such that the entire apparatus is affected by its stabilizing effect. Being a continuous ring, it additionally has the effect of holding the structure intact and maintaining its structural integrity while it is in motion. The spinning motion provides a centrifugal force while the annular ring creates a counter-balancing centripetal force.

Figure 8:
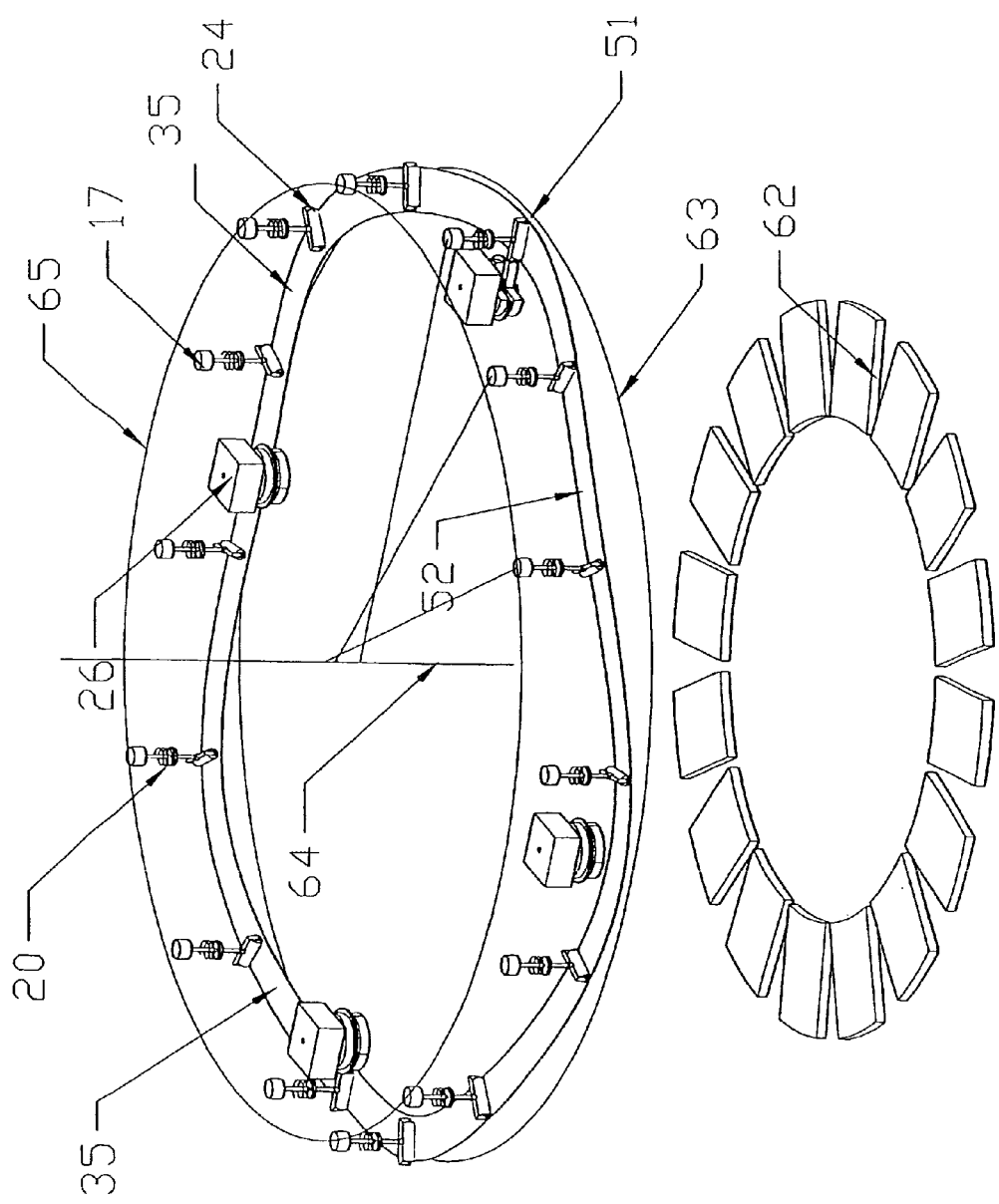
FIG. 8 is a perspective view of the sine-wave ring with piston assemblies and motor assemblies and a perspective view of the optional atmospheric filtering system.
Figure 14:
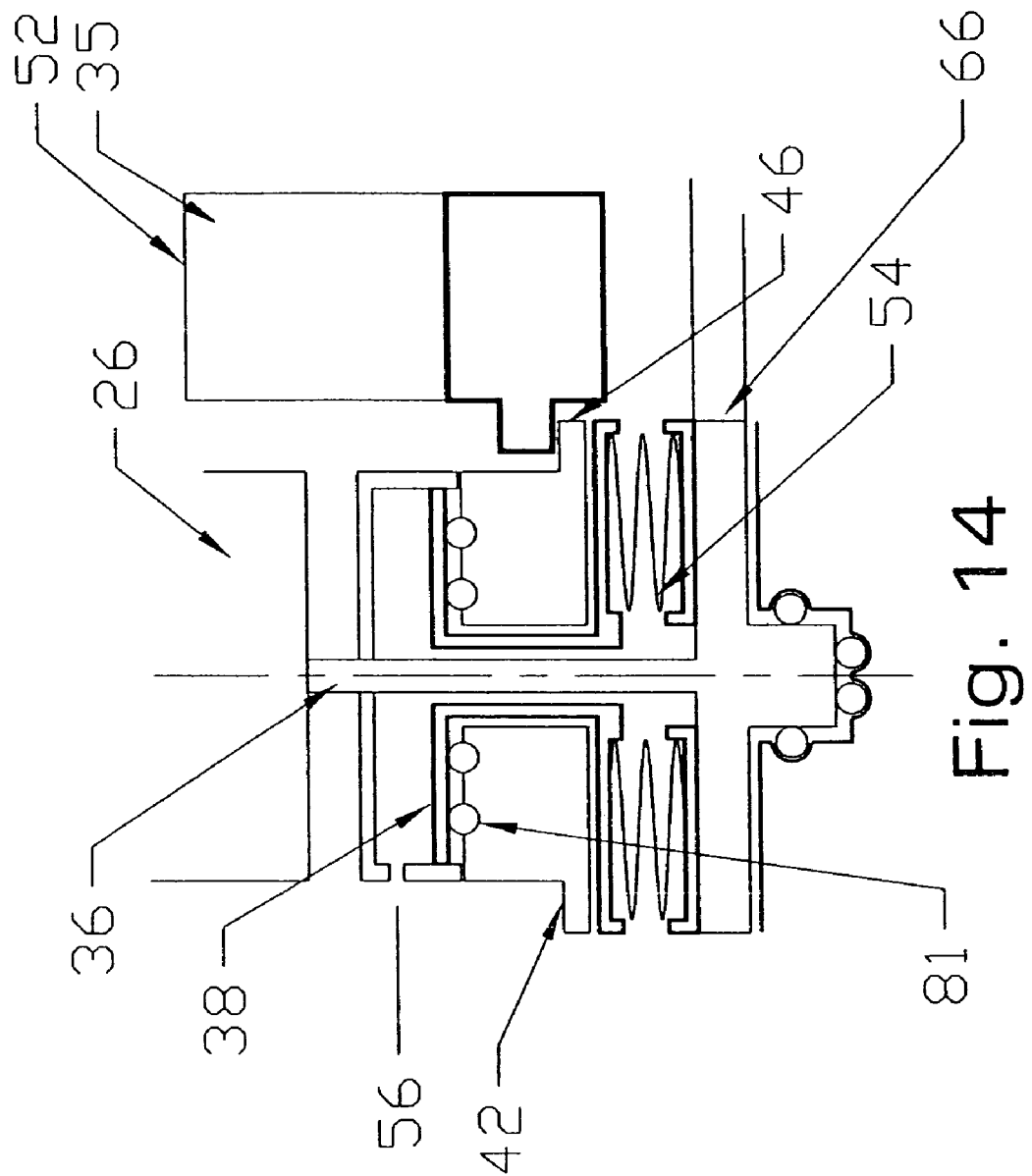
FIG. 14 is a section view of the sine-wave ring showing the lower drive wheel and the upper drive wheel in contact with the sine-wave ring.

In the space between the vertical leg of the rotating outward hull (5), FIG. 15, and the vertical leg of the stationary inward hull (79), a plurality of substantially identically weighted, equally spaced motors (26), FIG. 8, are positioned to be balanced around the central axis (64). Each said motor rotationally drives a rod (36), FIG. 14, that attaches to a lower drive wheel (48), FIGS. 14 and 24. Each of these rods (36) turns the lower drive wheel and either a friction connection or a gear connection (66) between the lower drive wheel and the support arm (67) for the outward rotating hull creates the motion which causes the outward hull to rotate. The support arm (67) rests on an annular roller bearing ring (58) embedded in the lift thruster base plate (78). A ring of roller bearings (15) embedded in the outer lip of the stationary inward hull working in conjunction with said annular roller bearings (58) and the lower drive wheel (48) connection (66) permits the outward hull to rotate freely creating the gyroscopic action.

The lower drive wheel (48) attaches to an upper drive wheel (40) by a spring connection (54) creating a similar rotation upon said upper drive wheel as exists in the lower drive wheel. This spring likewise causes a contact flange (42) to press (46) with a clutch-like grip against a projection lip (39) on a sine wave ring (35) creating a similar rotational motion in said sine wave ring as is exhibited in the outward rotating hull (1) thus causing the sine wave ring to function as a whole-system drive mechanism.

Figure 16:
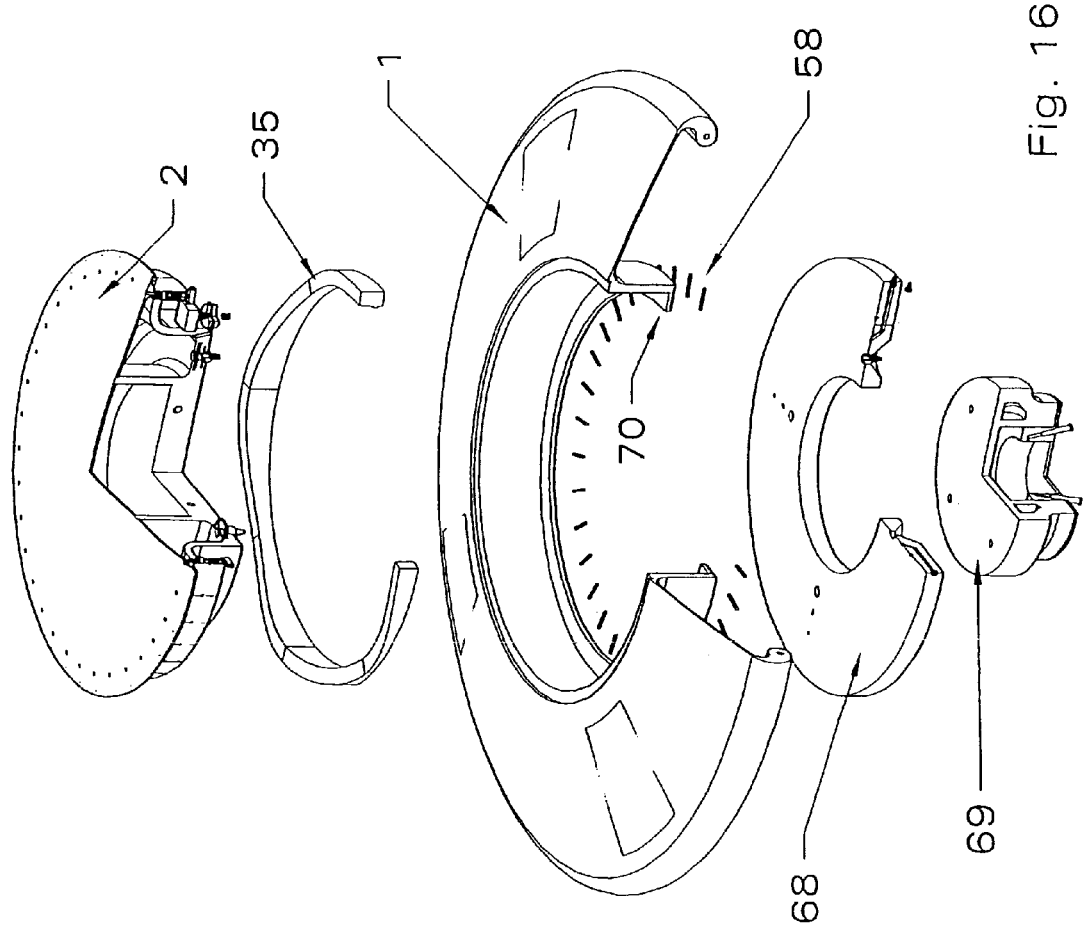
FIG. 16 is an exploded cut-away perspective view of the entire assembly
Figure 21:
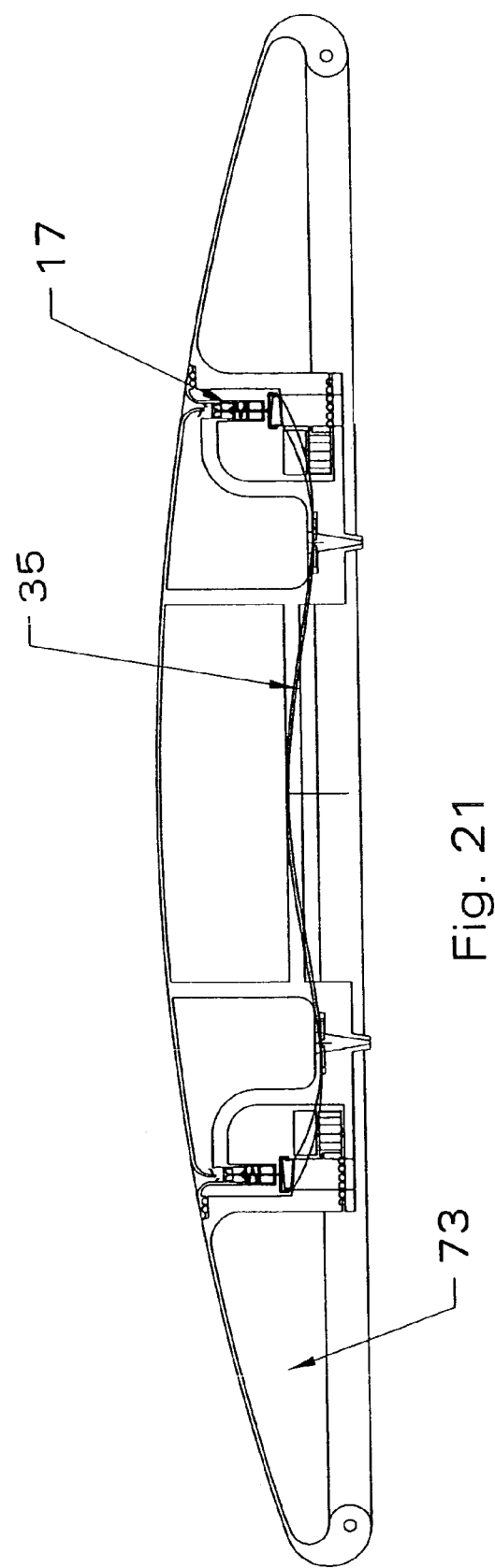
FIG. 21 is a full front section of embodiments of the present invention assembly showing the relative working positions of the sine-wave ring and the piston roller assembly.

The sinusoidal ring (35), FIGS. 8 and 16, consists of a situation whereby the harmonic motion of a sinusoid is positioned around the circumference of a circle and the distance of one cycle becomes a whole number multiple of that circumference. As known to one of ordinary skill, the equation for the sinusoid takes the basic form:

$$dy = r \sin A$$

where y is equal to the amplitude, but in order for the harmonic motion of the sinusoidal ring to permit the piston roller (24) to move freely over the rotating surface, the coefficient d of y must be less than about 0.5.

If the peak amplitude matched the normal sine curve, the forward movement of the sinusoidal ring against the piston roller (24) would be impeded because the vertical incline would be too steep. The harmonic amplitude movement of the piston would be destroyed likely causing the piston rod (25), FIG. 7, to be snapped. Also, in order for the sinusoidal ring to be constructed with continuous cycles flowing smoothly, the radius of the circumference of the sinusoidal ring is beneficially divisible by the radius of the sinusoid and be equivalent to a whole number quotient. As seen in the stretch-out view of said sinusoidal ring (35) in FIG. 11, the peak amplitude (52) is not much higher than the low height (51) creating a smooth flowing curve. FIG. 12 illustrates one cycle of the sine wave. The domain for the ring is equal to the circumference of the ring, and in the illustration as shown in FIG. 11, the said domain is equal to four cycles of the sinusoid that travels around its circumference. The circular base (63) of the sinusoidal ring defines the circumference of the ring with the upper oscillation movements being defined by the peak amplitude of the piston assembly (65), FIG. 8.

As the sinusoidal ring (35) turns, the harmonic movement is transferred to the piston assembly (17), as the piston roller (24), always in physical contact with the said ring, rolls along the modulating surface of said ring as it passes through the peak amplitude (52) and base amplitude (51) phases. The piston assembly (17) is housed within the inner stationary hull 2 and is likewise non-rotational. The said piston roller maintains its contact with the sinusoidal ring (35) due to the action of a piston spring (20) pressing against a piston spring flange (21) that is a part of the piston rod (25). The oscillation of the piston rod is enhanced by being encased in sealed, Teflon-coated roller bearings (19). A rocker arm (23) attached to a ball and socket connection (22) permits the piston roller (24) to maintain contact with the entire upper surface of the sinusoidal ring as it rotates by matching the degree of tilt of said surface. The vertical oscillation of the piston assembly (17) in the piston chamber (18) creates, alternately, a pressure-vacuum condition in said chamber, and the vacuum phase creates a pull against the air intake flap (14) seated at the base of the air intake opening (4) causing it to open while at the same time, the same action causes the exhaust flap (13) leading to the compression chamber (12) to be sealed against the said compression chamber opening rim. Air is sucked into the piston chamber (18) on the downward, vacuum stroke of the piston, and conversely, the upward compression stroke of said piston causes a pressure buildup in the said piston chamber forcing the intake flap (14) to seal closed against its rim and also forcing the exhaust flap (13) to open forcing air into the interior compression chamber. The air being sucked into the air intake port (4) creates the said negative pressure that aids in lift situations.

Accumulated compressed air in the air compression chamber (12) is used to supply all three types of thrusters—propulsion thrusters (6), lift thrusters (8), and directional/stabilization thrusters (9). All of these thrusters may beneficially be of a modified air screw-impeller type, and control of the quantities of air flow to the thrusters will be maintained by aperture openings (29) leading to the thrusters.

The directions that the thrusters are pointing (77), FIG. 24, will determine the resulting direction of thrust and will be used primarily for rotational stabilization and directional control. The direction of the ball and socket rotational air screw impellers (30) will be controlled by pressure directional controls (57). Annular tube feeders (27) from the compression chamber (12) to an auxiliary high-compression chamber (28) for propulsion thrusters (28) provide maximum forward and stopping motion. A modified adaptation of this configuration would permit a ram jet assembly to be substituted for the propulsion thrusters with the fuel stored in the battery or fuel storage compartment (60).

Operationally, the contact flange (42) on the upper drive wheel (40) is in contact (46) with the projection lip (39) on the sinusoidal ring (35). In a situation where excess pressure should be built up in the compression chamber (12), excess air pressure from the said chamber will pass through an intake opening (55), FIG. 13, into a pressure relief compression chamber applying said pressure to a moveable compressor (38) which moves within the pressure relief compression chamber housing (37) and acts in opposition to a spring located within a housing (45). When the pressure (56) is not sufficient to affect the spring, the resistance spring (54) is not compressed and causes the lower drive wheel to press against the projection lip (39) on the sine-wave ring (35) thereby allowing the rotational motion of said sine-wave ring to generate the compression necessary for flight. The roller bearings (81) allow the upper drive wheel (40) to spin freely within the chamber housing (37). When the pressure (55) builds up sufficiently to overcome the resistance to the compression spring (44), a gap (41) is created thereby not permitting said upper drive wheel (40) to drive the motion of the sinusoidal ring (35) alleviating pressure buildup. There are other methods by which excessive pressure buildup can be overcome, pop open valves and such, this is simply one. The rotating connecting rod (36) from the motor is held in place by a base spindle (47) that is allowed to rotate due to the action of side bearings (49) and spindle bearings (53) housed within the upper surface of the lower plate (50).

In order to easily achieve flight, the VTOL should be constructed of light weight materials, likely plastics. However, because of the dangers of space debris, the exterior hull should also be strong to avoid being punctured. Exemplary materials for the hull includes such things as several plies of titanium mesh (76) and Kevlar 29 fabric (75) with exterior surfaces of clear fiberglass.

Other improvements and additions are contemplated as well for embodiments of the present invention although not explicitly described in detail herein. For example, retracting arms that are configured to grip objects or people can be added without departing from the scope of the present invention. Furthermore lifting devices may be attached to various portions of the aircraft exterior to aid in lifting objects with the aircraft. Thus, there has been described herein a remote controlled or manned saucer shaped vertical takeoff and landing (VTOL) aircraft which includes a ducted compression thrust in conjunction with an auxiliary propeller lift, powered by batteries or magnetic induction engines to propel in vertical, hover, and horizontal flight such VTOL aircraft and to steering assemblies and other controls for controlling translational movement and maneuvering of all such aircraft.

An additional embodiment of the present invention is described with respect to FIGS. 27-48. Explicitly describing this alternative embodiment is not intended to represent the only other embodiments in which the present invention may be practiced. All of the conceptual notions described with the earlier embodiment above still apply, however this alternative embodiment includes alternatives and substitutes for some of the concepts and functions described earlier. Below is a legend table for the elements depicted in FIGS. 27-48. Functional names and labels have been given to each element but are not intended to limit these elements to only these functions but rather to aid the reader in understanding embodiments of the present invention.

| | |
|---|---|
| 100. | Sinusoidal Plate |
| 101. | Perpendicular Sine Wave |
| 102. | Central Axis |
| 103. | Sine Wave Tracking Groove |
| 104. | Ninety degree angle |
| 105. | T-shaped Piston Rod |
| 106. | Upper Tracking Arm |
| 107. | Vertical Sine Wave |
| 108. | Horizontal Sine Wave |
| 109. | Motor |
| 110. | Spindle |
| 111. | Motor Gear |
| 112. | Ledge Attached To Bearing Tower |
| 113. | Motor Gear Bearing Track |
| 114. | Open-Center Gear |
| 115. | Open-Center Gear Cogs |
| 116. | Open-Gear Track |
| 117. | Opening In Gear |
| 118. | Motor Gear Cogs |
| 119. | Motor Gear Collar |
| 120. | Tapped Opening For Set Screw |
| 121. | Assembly Bolts |
| 122. | Pressure Relief Valve Assembly |
| 123. | Bearings Embedded in Bearing Tower Ledge (not visible) |
| 124. | Sinusoidal Plate Cogs |
| 125. | Lower Arm of T-shaped Piston Rod |
| 126. | Cylindrical Channel |
| 127. | Piston |
| 128. | Piston Chamber |
| 129. | Intake Flap |
| 130. | Exhaust Flap |
| 131. | Air Intake Chamber |

| | |
|---|---|
| 132. | Intake Fan |
| 133. | Cover Lid |
| 134. | Stop Ledge for Piston Flaps |
| 135. | Bearing Tower and Motor Housing |
| 136. | Compressed Air Chamber |
| 137. | Lid Perimeter Gap |
| 138. | Fan Blade |
| 139. | Aircraft Hull |
| 140. | Directional Turning and Stabilization Thrusters |
| 141. | Bearing Ledge |
| 142. | Battery/Motor Compartment |
| 143. | Gate Plate |
| 144. | Servo Control Rods |
| 145. | Rack Teeth |
| 146. | Exterior Spur Gear Teeth |
| 147. | Thread Cylinder |
| 148. | Threaded Rod |
| 149. | Slotted Needle Nose Valve |
| 150. | Swivel Housing for Needle Nose Valve |
| 151. | Valve Opening |
| 152. | Swivel Assembly |
| 153. | Rod In The Center |
| 154. | Rack and Gear Assembly |
| 155. | Rod Off Center |
| 156. | Needle Nosed Closers |
| 157. | Cylindrical Damper |
| 158. | Propulsion Chamber |
| 159. | Pawl-Spring Ratchet and Hull Attachment |
| 160. | Annular Fan Ring |
| 161. | Fan Attachment Ring |
| 162. | Alignment Nodes |
| 163. | Motor Gear Spindle Opening In Collar |
| 164. | Cover Lid Perimeter Crimp |
| 165. | Impulse Thrusters Chamber |
| 166. | Vertical Lift Thrusters |
| 167. | Vertical Sine Wave Wrapped Around Diameter |
| 168. | Diameter |
| 169. | Ratchet Ring |
| 170. | Slotted Servo-Rod Support |
| 171. | Teflon Coated Pressure Seal |
| 172. | Swivel Assembly Ledge |
| 173. | Compression Seal |
| 174. | Drag Edge |
| 175. | Blunt Needle-Nosed Closer Spring |
| 176. | Closer Plate |
| 177. | Tapered Thruster |
| 178. | Swivel Assembly Bearing |
| 179. | Bearings |
| 180. | Valve Spring |
| 181. | Impulse Thruster Assembly |
| 183. | Rotary Gear |
| 184. | Motor Housing |
| 185. | Lip On Blunt Nosed Closer |
| 186. | Compression Seal Open |
| 187. | Compression Seal Closed |
| 188. | Pressure Input Valve Vent |
| 189. | Opening To Outside Pressure |
| 190. | Slotted Vent Cage |
| 191. | Vent Housing |
| 192. | Pressure Plate |
| 193. | Rotation-blocking Arm |

Figure 27:
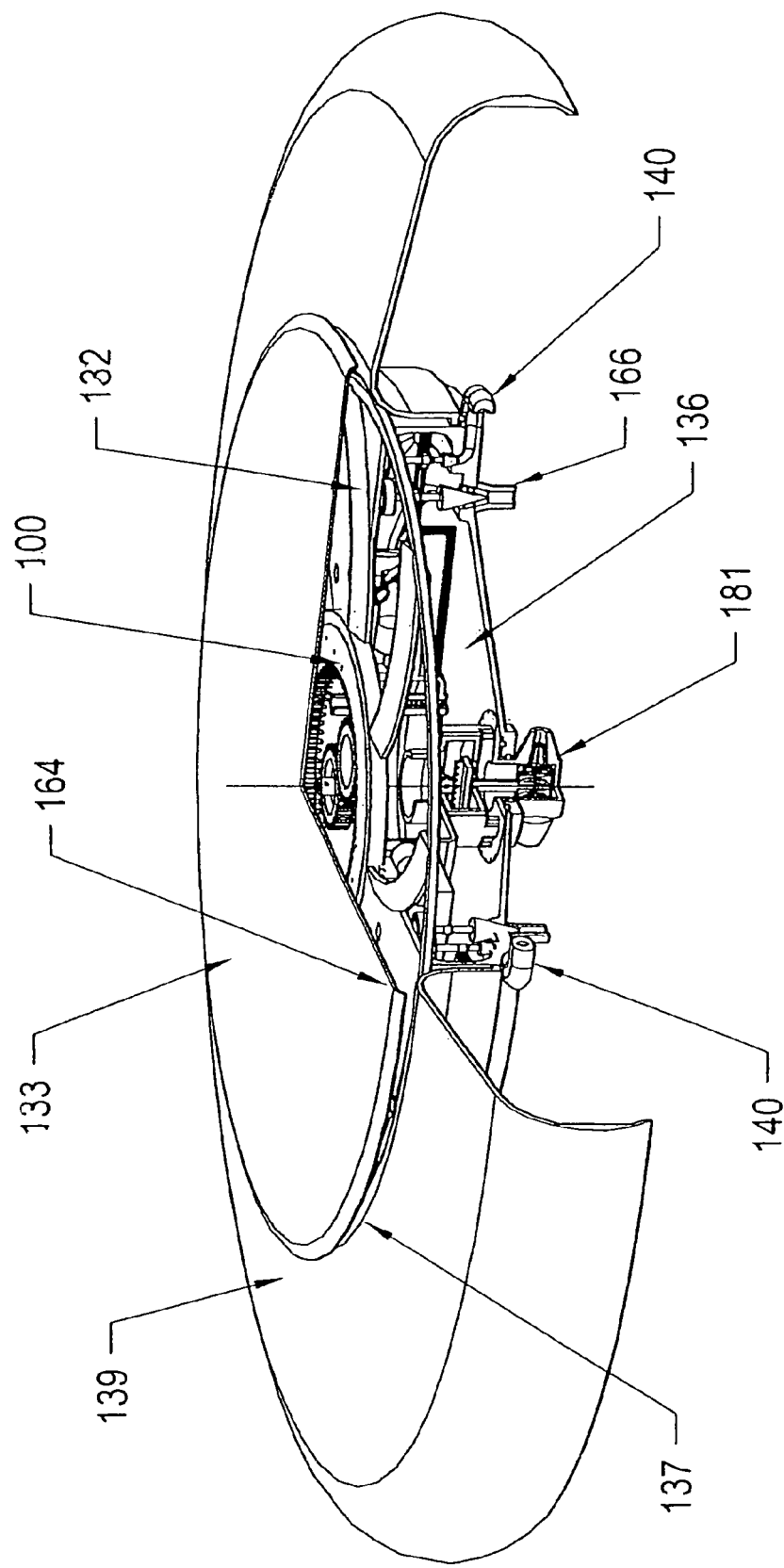
FIG. 27 is a top view perspective section of a vehicle in accordance with the principles of the present invention.
Figure 36:
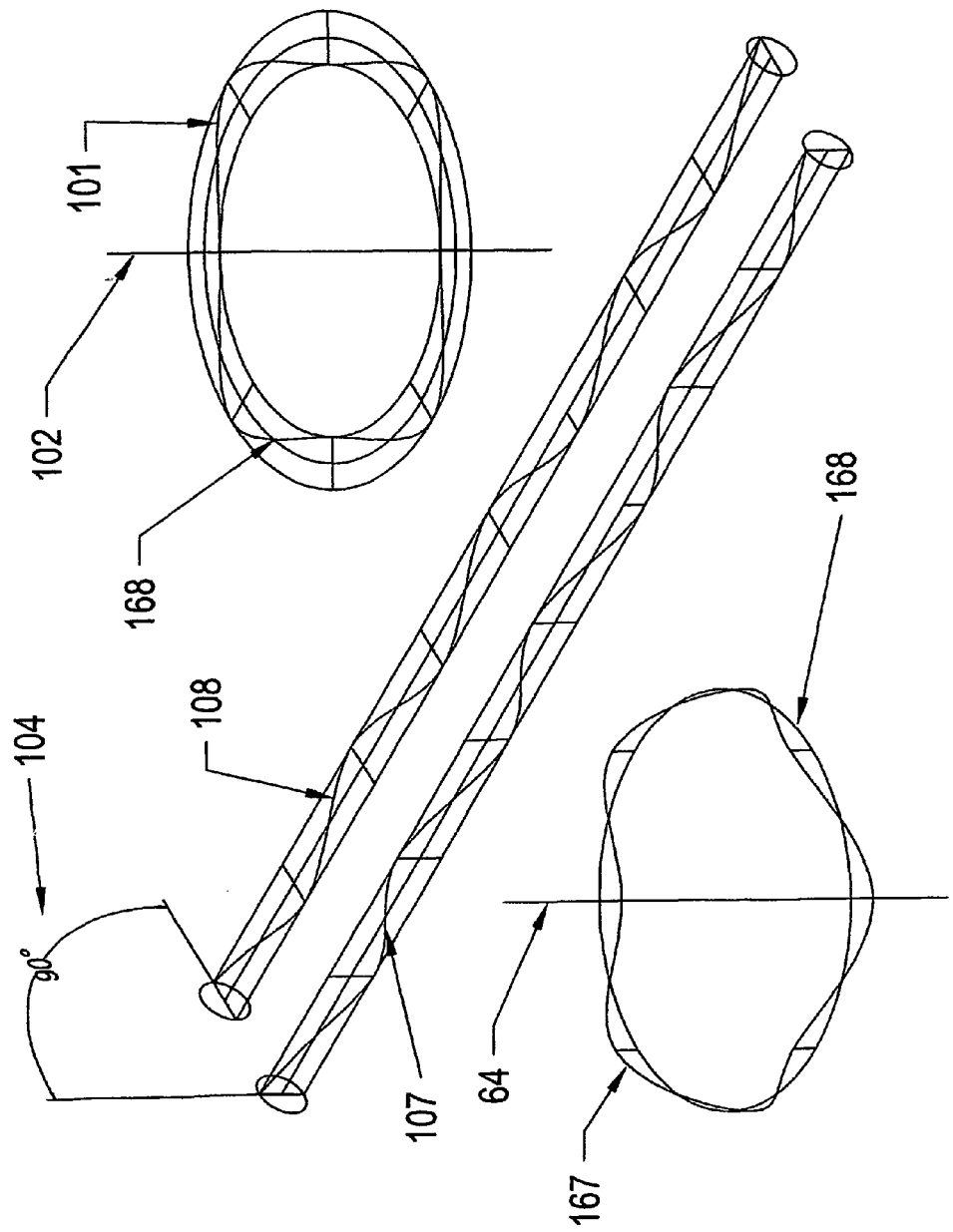
FIG. 36 is a diagram illustrating the vertical and horizontal sine wave motions resulting from the sinusoidal plate in accordance with the principles of the present invention.
Figure 37:
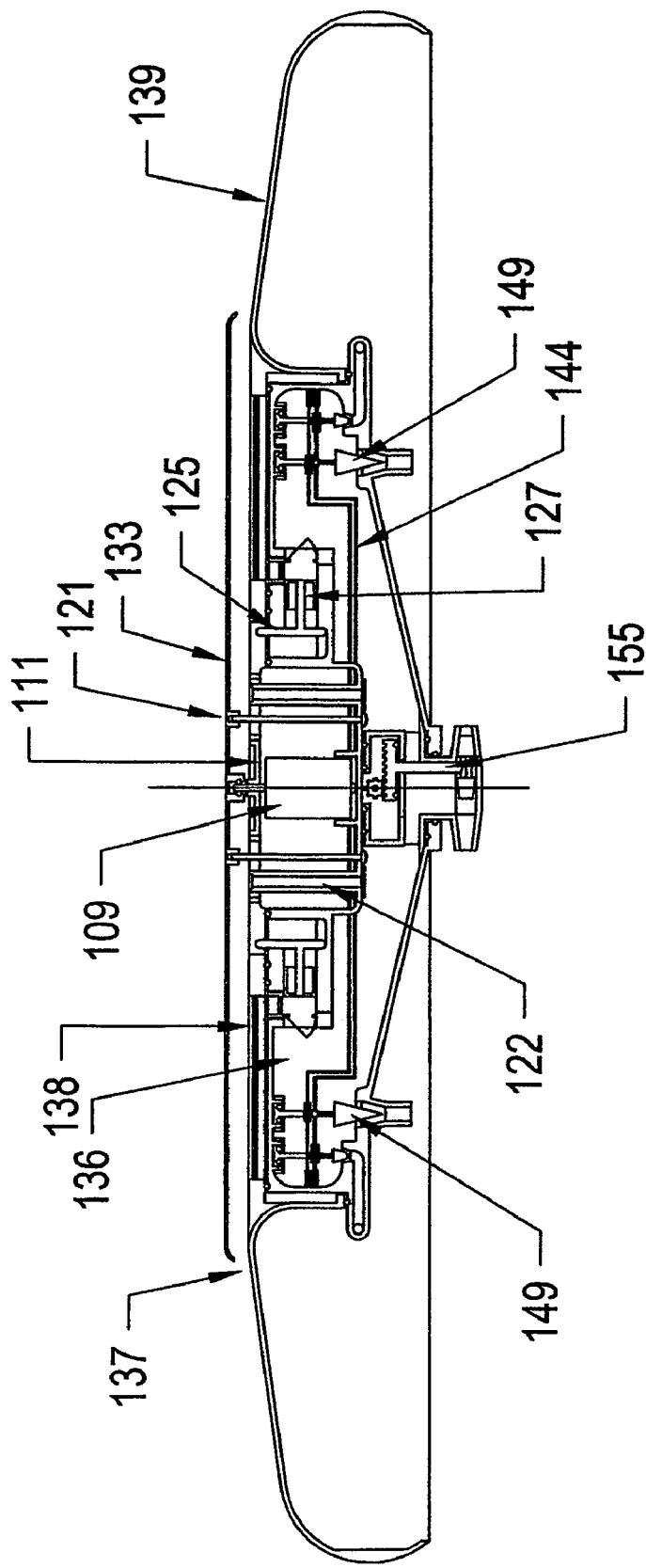
FIG. 37 is a full front view section showing the needle valves of vertical thrust.

In the embodiment of FIGS. 1-26 a sine-wave ring identified as 35 was used to cause up-and-down motion of a plurality of pistons as the hull of the vehicle rotated. In this alternative embodiment, the ring 35 has been replaced by a sinusoidal plate 100, as shown in FIG. 27. FIG. 36 illustrates the effective result of the sinusoidal plate 35 rotating around a central axis of the vehicle. As described earlier, the movement of the ring 35 resulted in a sine wave traveling in an undulating vertical motion 107 and when wrapped around the diameter 168 of a given circle, the sine wave moves in a direction 167 which is parallel to a central axis of the aircraft, originally identified as 64 (See FIG. 8) and now identified as axis 102, which passes through the center of the said given circle.

Figure 33:
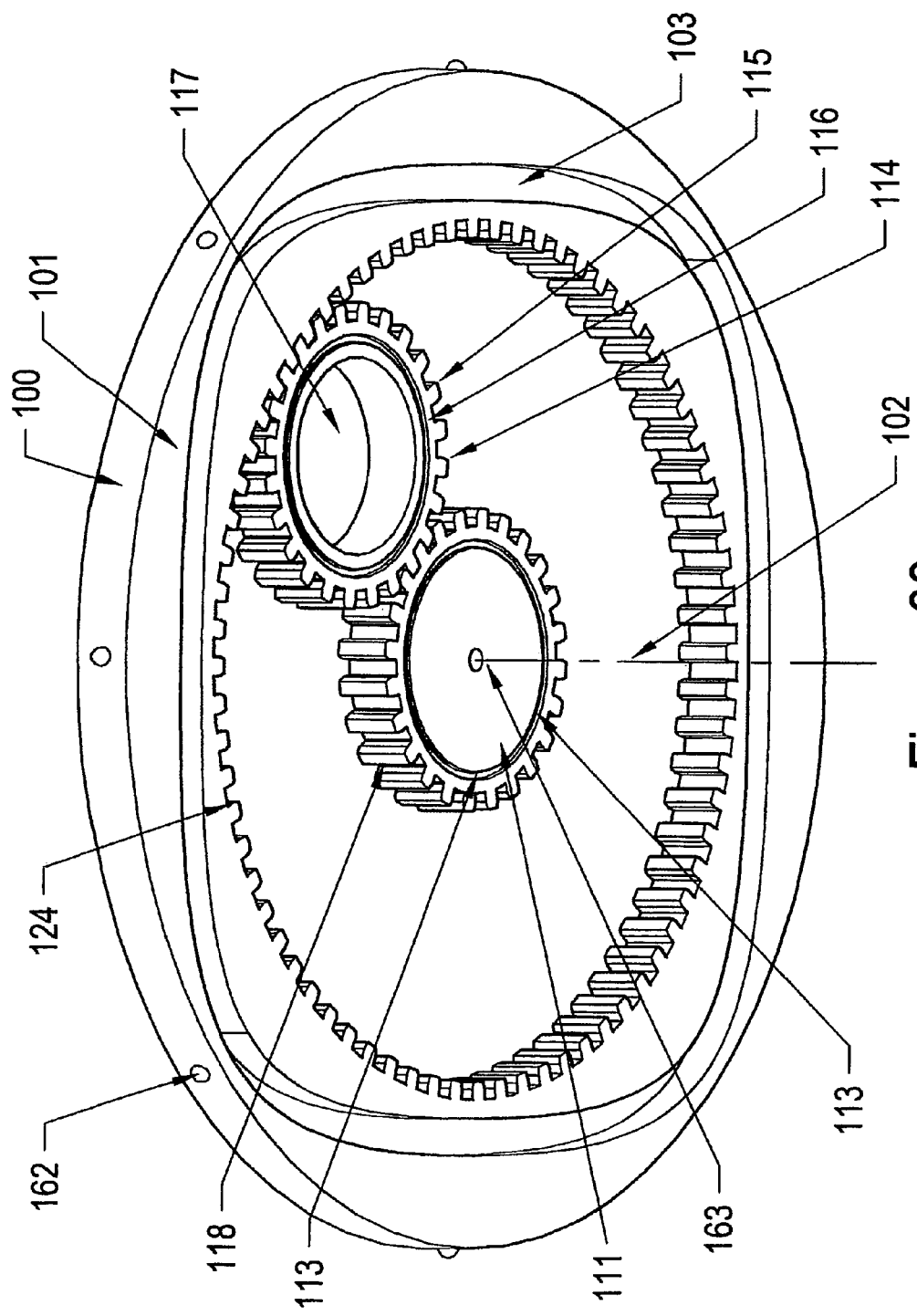
FIG. 33 is an underside perspective of the sinusoidal plate with the gears of FIG. 32.
Figure 34:
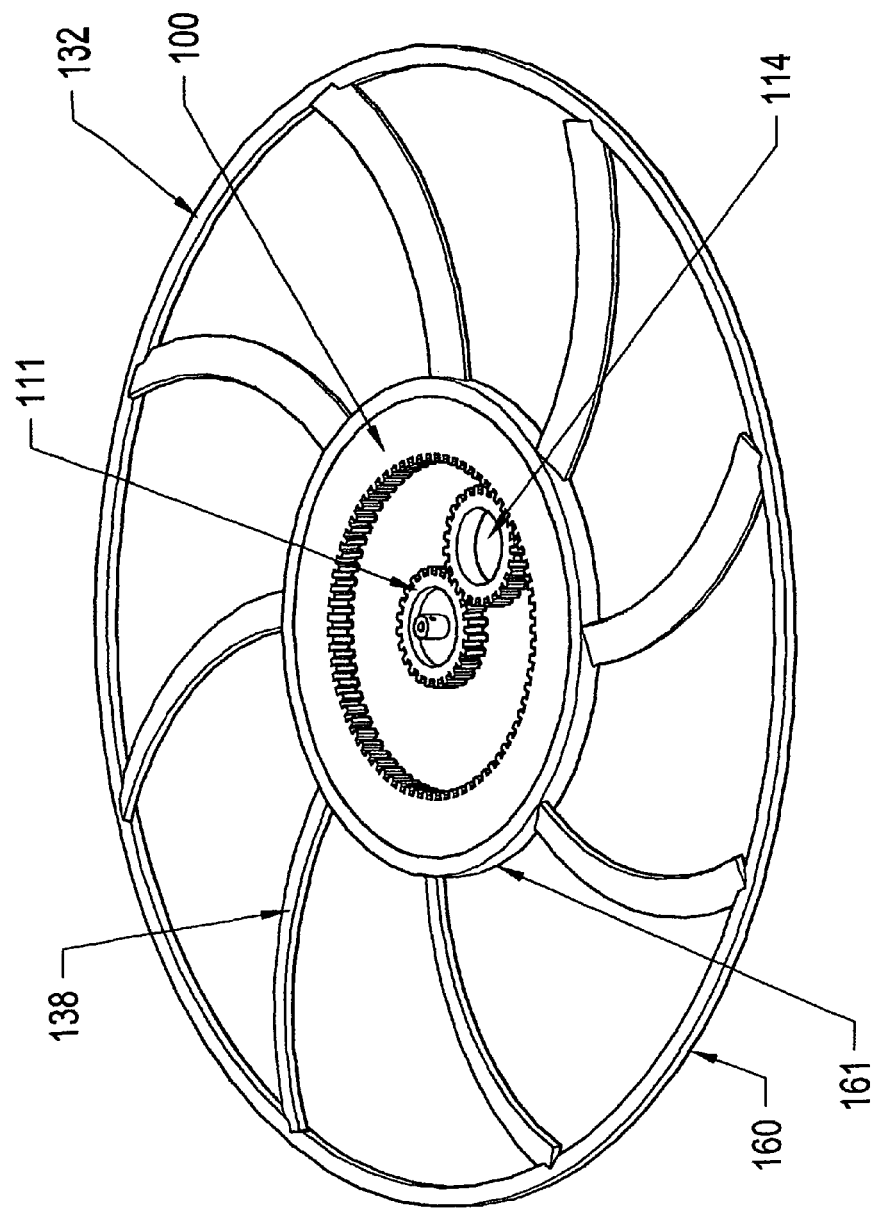
FIG. 34 is a top perspective of the sinusoidal plate assembly with the fan.
Figure 35:
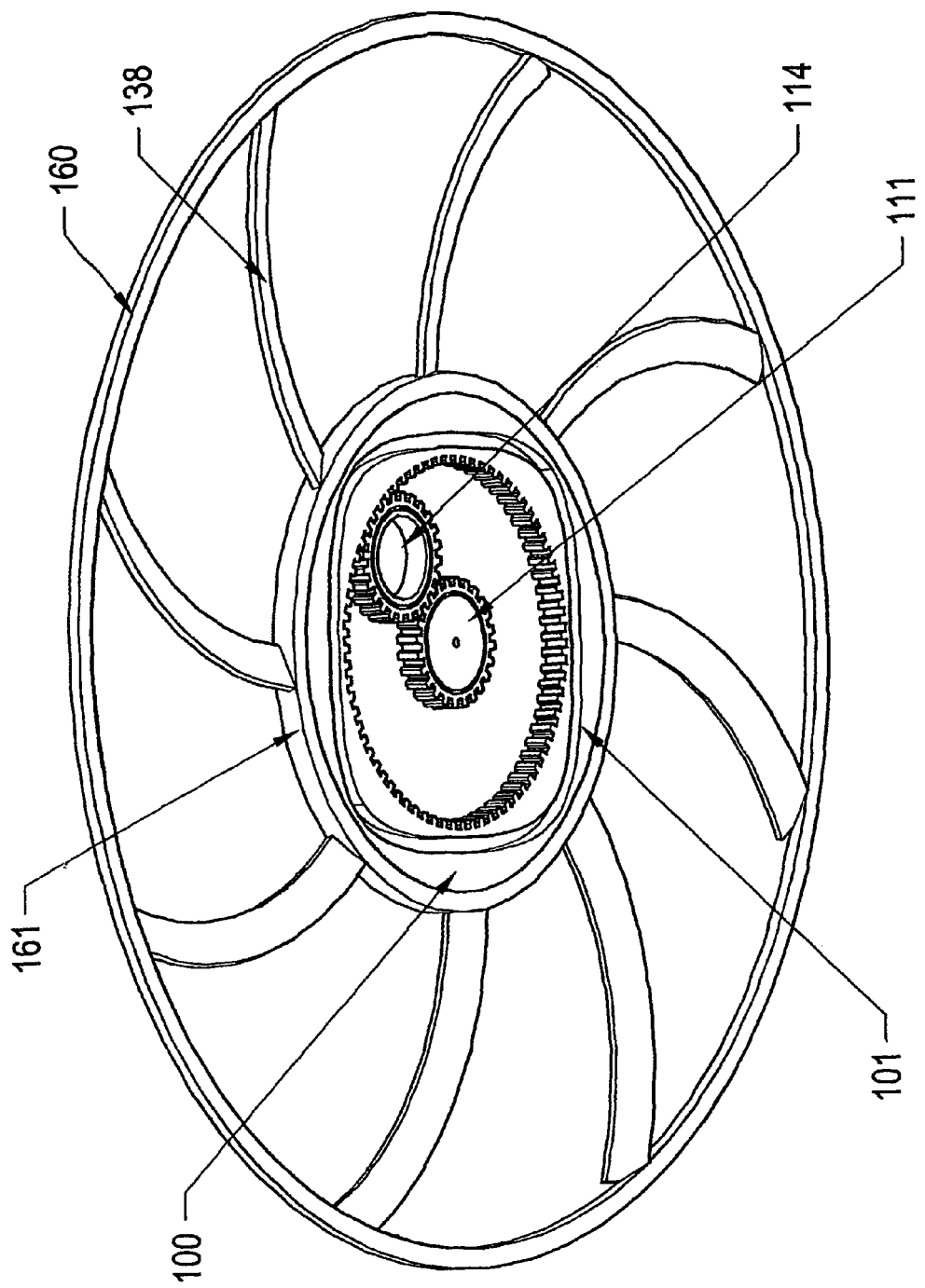
FIG. 35 is an underside perspective of the sinusoidal plate assembly with the fan.

With the substitution of the sinusoidal plate 100 the horizontal sine wave 108 is rotated through 90 degrees 104 and now moves in a direction that is perpendicular to the central axis 102 of the aircraft and is wrapped around the diameter of a given circle 168. As a result the plate 100 generates an undulating in-and-out movement 101. When the motion is given a certain thickness and is engraved into the plate 100, it creates a sine wave tracking groove 103 (as shown in FIG. 33). The sinusoidal plate 100 is designed to rotate around the central axis 102 in a manner similar to that of the aforementioned original sine-wave ring 35, however because the motion of the sine wave has been rotated through 90 degrees and wrapped around the diameter of a circle, when the sinusoidal plate 100 is spun, the undulating motion 101 is created which causes the sine wave base (originally 51, see FIG. 11), and the sine wave crest (originally 52, see FIG. 11), to be in a plane which is no longer parallel to the central axis 102, rather, it is perpendicular to the central axis 102.

Figure 32:
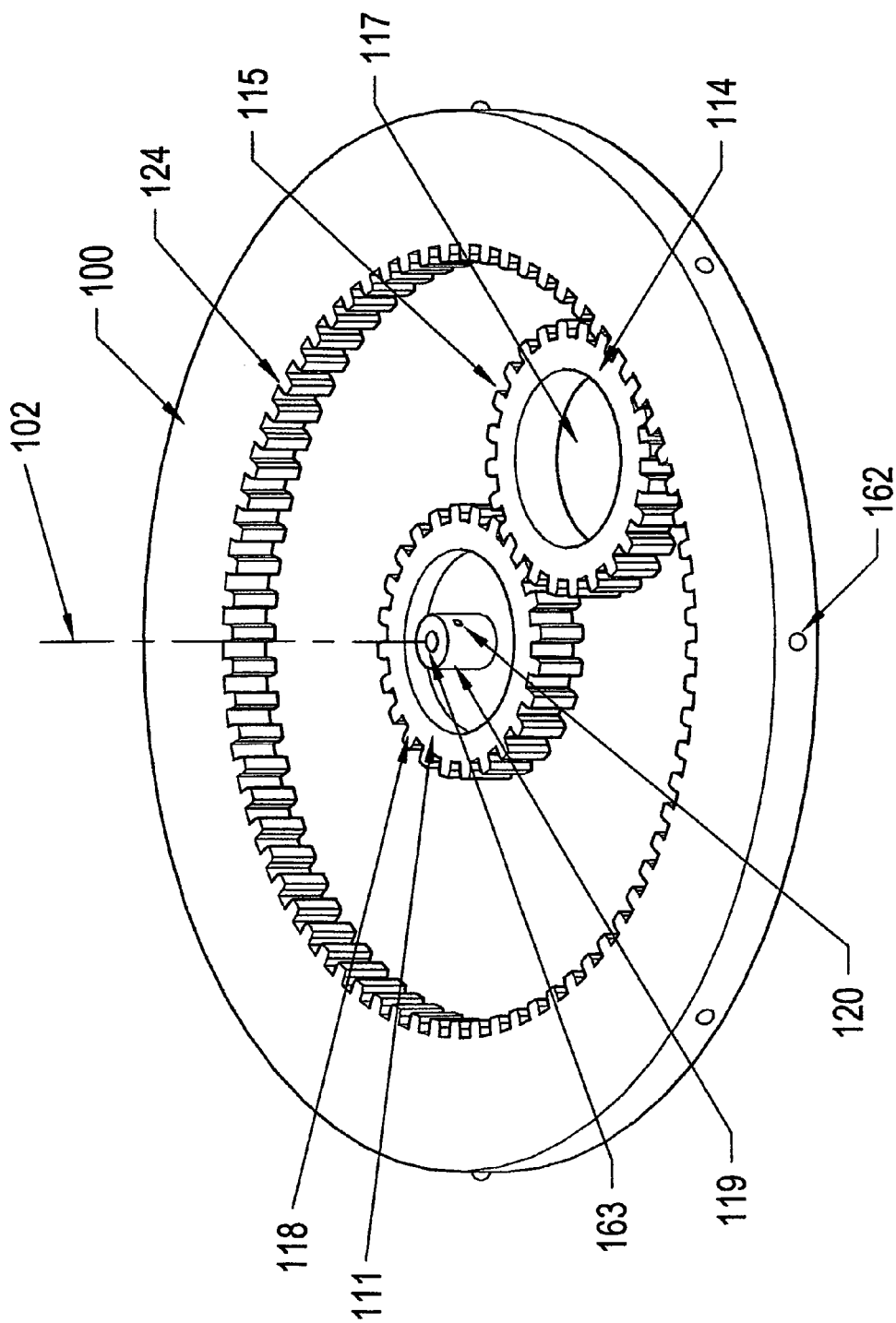
FIG. 32 is a top perspective of the sinusoidal plate with gears in accordance with the principles of the present invention.
Figure 39:
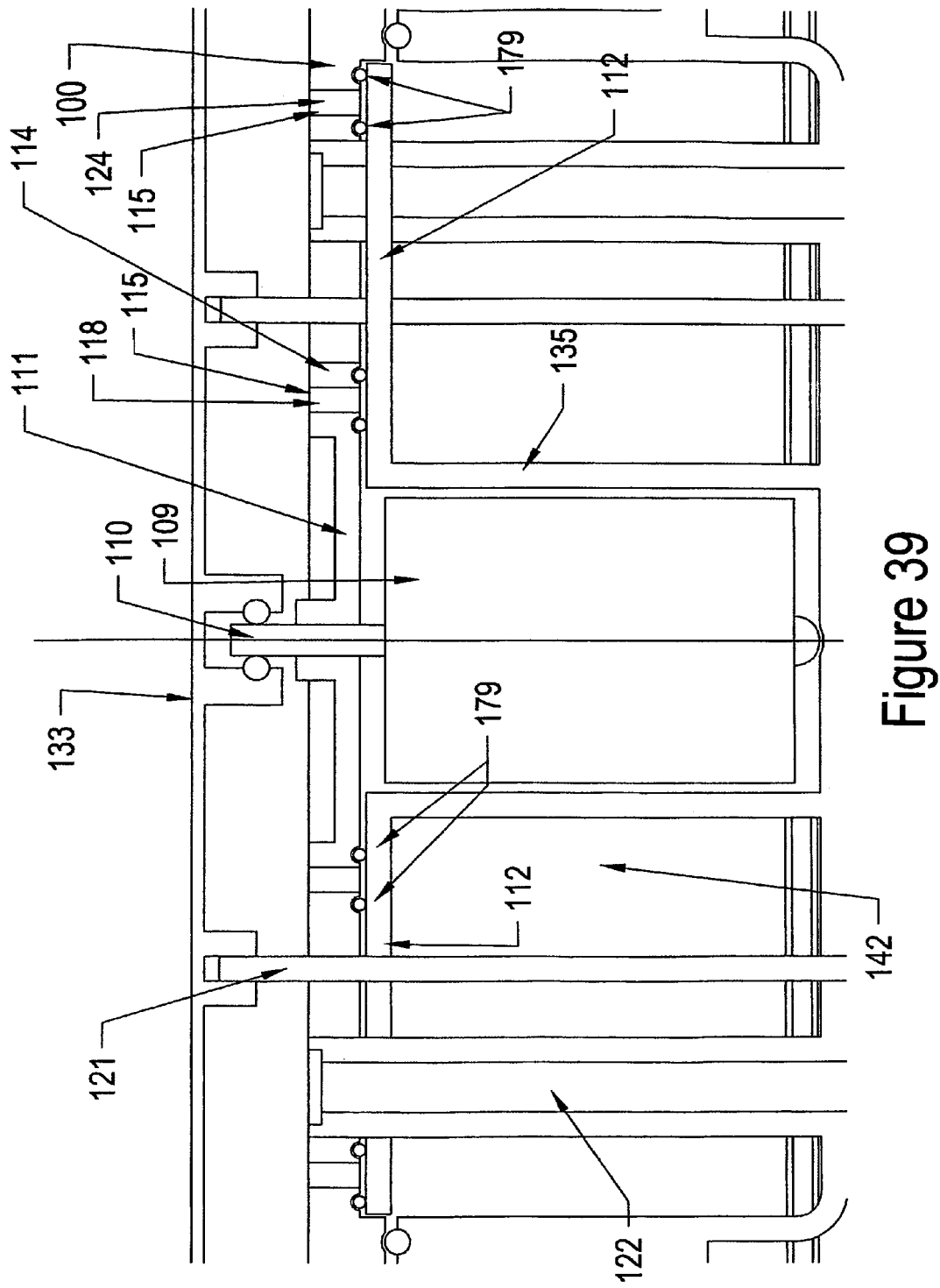
FIG. 39 is an enlarged view of the bearing tower and the gear supports.
Figure 40:
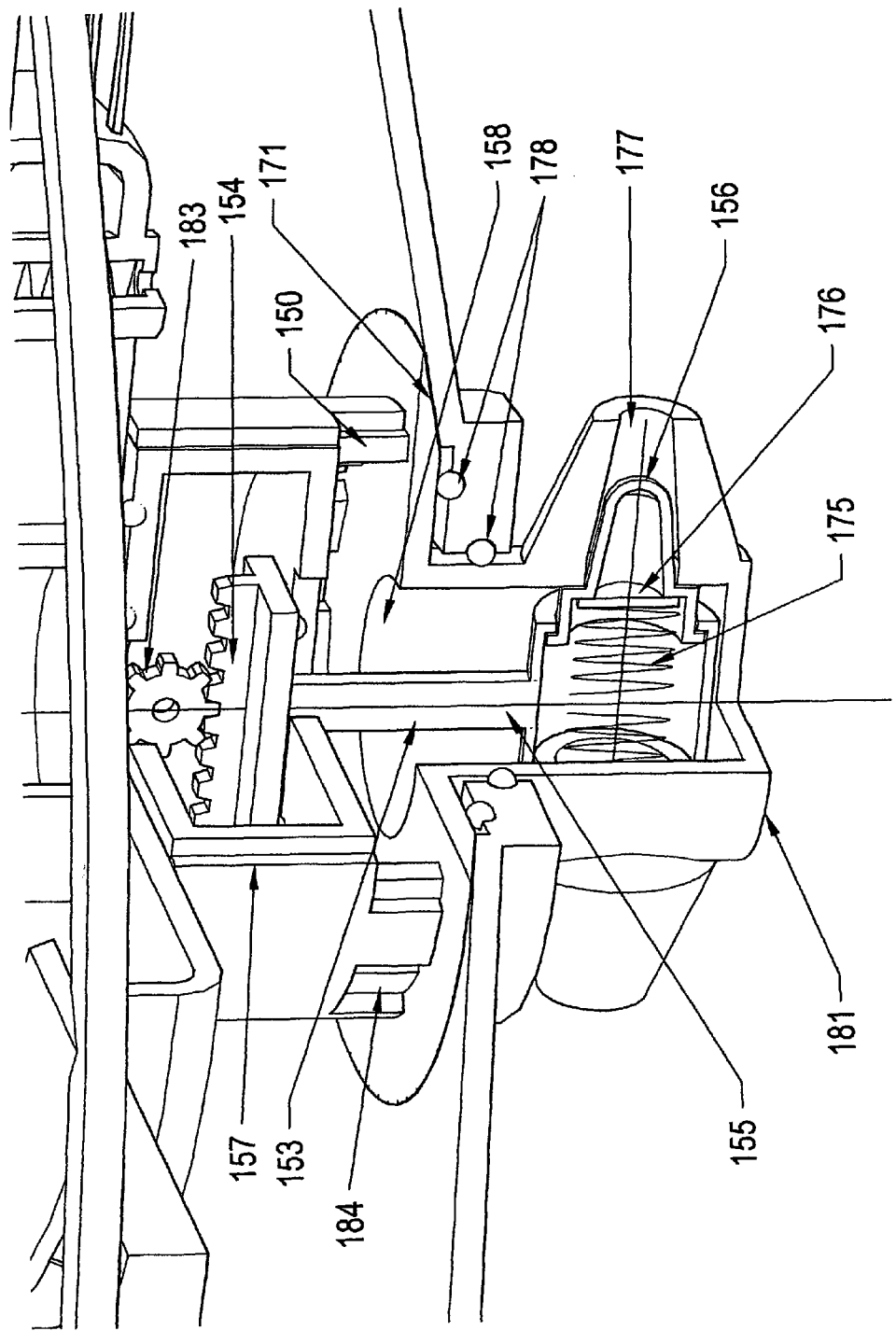
FIG. 40 is an enlarged section perspective assembly of the swivel propulsion thruster.
Figure 41:
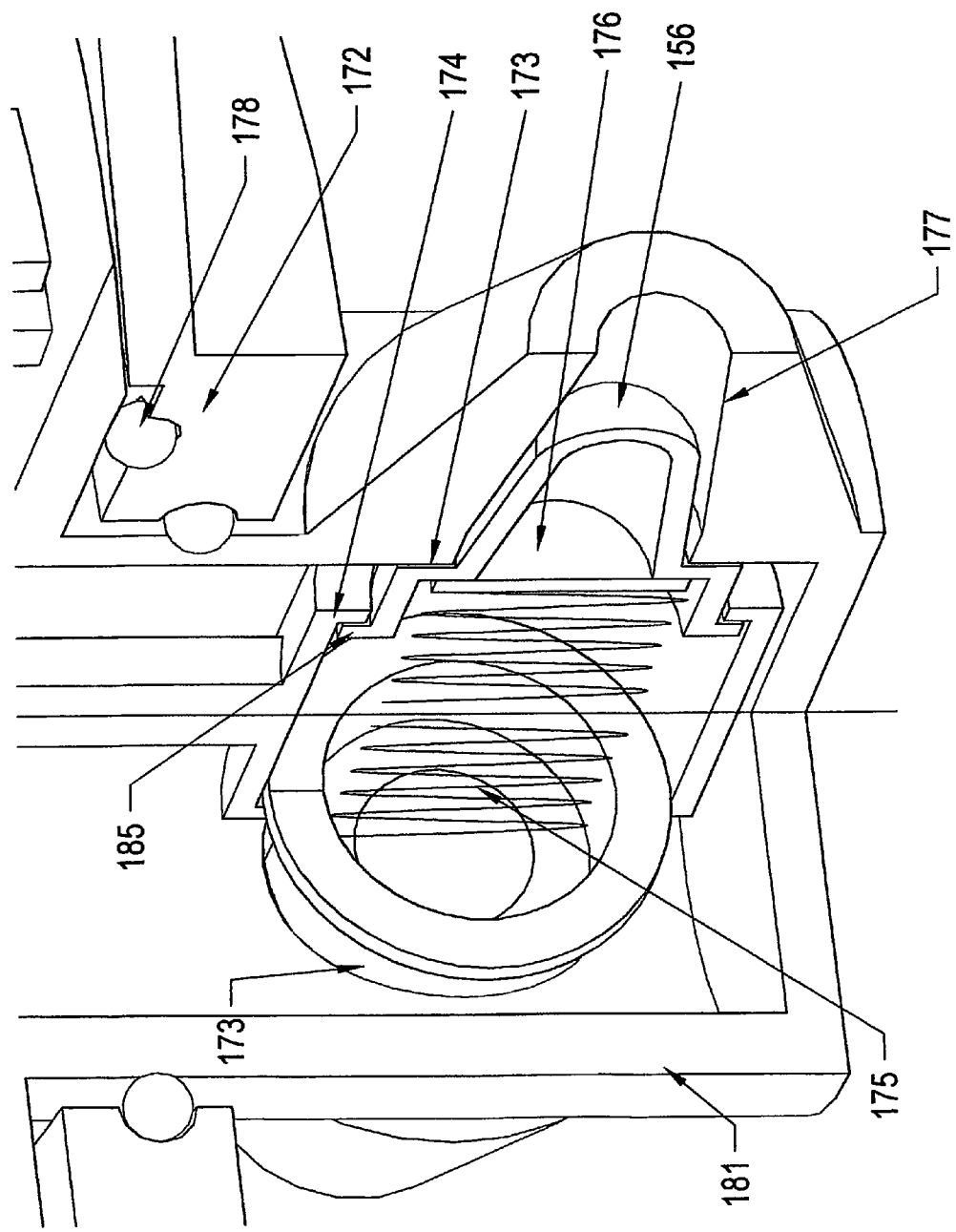
FIG. 41 is an enlarged cut-a-way of the blunt nose closer.
Figure 47:
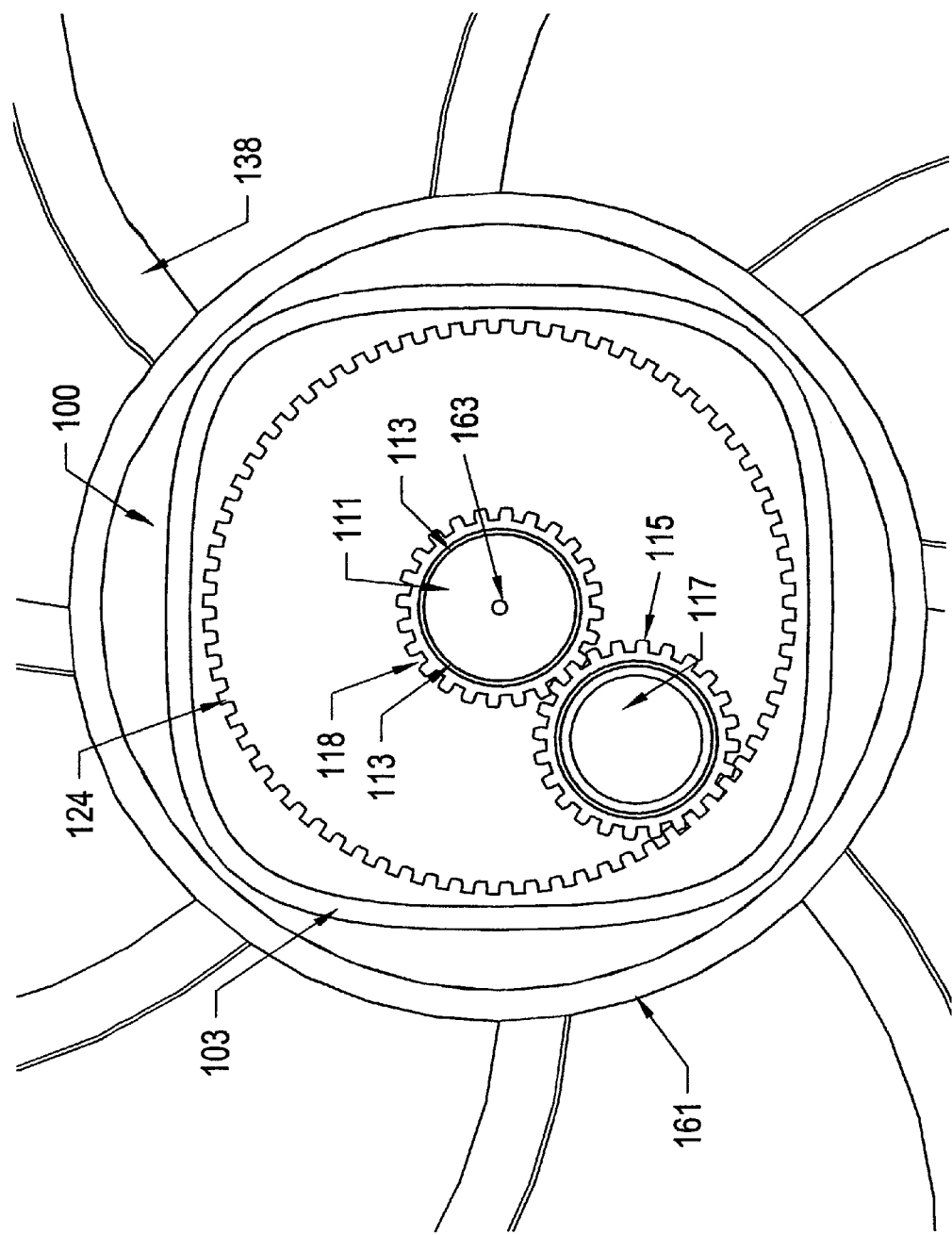
FIG. 47 is an underside enlargement of the sinusoidal plate.
Figure 48:
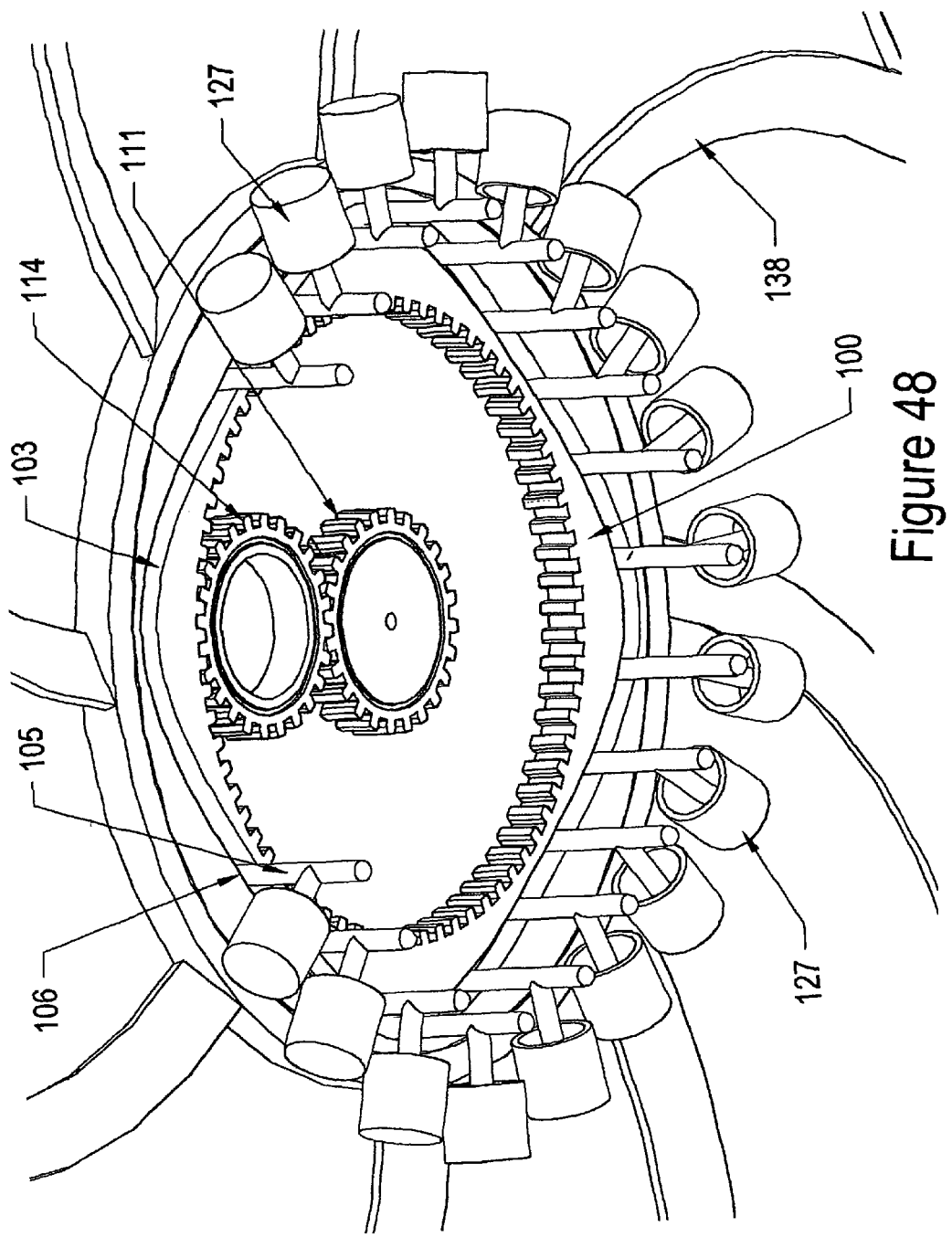
FIG. 48 is an underside pictorial of the sinusoidal plate and the pistons.

The widening and embedding of the sine wave within the plate 100 to create the tracking groove 103 creates a system for generating a harmonic motion in a horizontal direction for receiving a tee-shaped piston rod tracking device 105, as shown in FIG. 47. When the upper tracking arm 106 of a tee-shaped tracking device 105 is inserted into the tracking groove 103 and the rotating motion is imposed around the central axis 102, the upper tracking arm 106 will be forced into a horizontal in and out motion. The tracking groove 103 and the upper tracking arm 106 may be either Teflon coated or contain roller bearings embedded into the tracking arm or a combination of both may be used to create smoothness of motion. As depicted in FIGS. 32 and 39, the rotational motion of the sinusoidal plate 103 is created when the rotating spindle 110 on a motor 109 is locked into the opening 163 of the collar 119 on the motor gear 111 with a set screw in tapped opening 120. When the motor 109 is engaged, it activates a system of gears, e.g., the motor gear 111 and the open-center gear 114, which then causes the sinusoidal plate 100 to revolve. One benefit of the sine wave motion produced by the plate 100 rather than the previous ring 35 is that now the sine-wave motion is perpendicular to the central axis 102 which creates a situation whereby the piston springs 20 (described earlier) are no longer required to generate piston 127 movement within the piston cylinder 128 (See FIG. 29).

As previously stated, the motor gear 111 can be clamped to the rotating spindle 110 by a mechanism such as a set screw placed in the motor gear collar 119. The motor gear can rest on a set of bearing towers ledges 112 which permits the rotational movement of the motor gear 111 as initiated by the rotating spindle 110. As the motor gear 111 rotates, the gear cogs 118 of the motor gear 111 engage the gear cogs 115 of the open-center gear 114 and create a counter rotation. The purpose for the center opening of the said open-center gear 114 is to allow access space for the assembly bolts 121 and the pressure relief valve assembly housing 122 which also doubles as a bearing tower for ledges 112 that support the motor gear 111 and open-center gear 114 assemblies to pass through the opening 117 while transferring the rotational motion to the sinusoidal plate 100. The track 116 of the open center gear 114 and the track 113 of the motor gear 111 both revolve while resting on bearings 123 imbedded in the bearing ledge 112.

When the cogs 115 of the open center gear 114 engage the cogs 124 of the sinusoidal plate 100, another counter rotation is executed and the said sinusoidal plate 100 rotates in a similar direction to the original motion of the motor gear 111. The resultant rotation of the sinusoidal plate 100 creates the harmonic motion of the sine wave tracking groove 103. The upper tracking arm 106 of the T-shaped rod 105 is forced to track the movement of the groove 103 and subsequently the lower arm 125 of the T-shaped rod 105, which is housed in a cylindrical u-channel 126 (see FIG. 38), generates and in- and-out movement which is perpendicular to the central axis 102.

The entire assembly can be Teflon coated to reduce friction and to negate the need for bearings, although one of ordinary skill will recognize that bearings could be introduced into the system in some manner as needed. In effect, the lower arm 125 of the tee-shaped rod 105 connects to and controls the motion of a piston 127 as it slides inside the Teflon coated piston chamber 128. On the backstroke of the piston, negative pressure is applied to the intake flap 129 (See FIG. 38), and the resulting vacuum opens said intake flap 129 and closes the air exhaust flap 130 allowing air to be sucked from the air intake chamber 131 into the said piston chamber 128. On the forward stroke, the compressed air in the piston chamber 128 forces the air intake flap 129 to close and forces the air exhaust flap 130 open thereby pushing the compressed air into the compressed air chamber 136. A ledge 134 inside the piston chamber 128 acts as a stop to prevent the intake flaps 129 and the exhaust flaps 130 from moving too far during the intake and exhaust functions thereby failing to create the vacuum necessary for the compressive aspects to function.

An air intake fan 132 is attached to the sinusoidal plate 100, and the rotation of the said sinusoidal plate 100 creates similar rotational movement in the intake fan 132. As the fan 132 turns, the fan blades 138 suck air into the lid perimeter gap 137 under the cover lid 133 and over the outer surface of the aircraft hull 139. Nominal lift is generated on the aircraft by this action. The action of the fan blades 138 forces maximum air supply into the air intake chamber 131. The intake fan 132, which is attached to the sinusoidal plate 100, is also attached to the hull 139, and as the inner configuration turns, the hull also similarly turns creating a Frisbee effect.

Bearing ledges 141 on the directional turning and stabilization thrusters 140 support the aircraft hull 139 and support the rotational movement of the entire device. The fan is attached to the sinusoidal ring by a fan attachment ring, and if it is necessary, for the sake of construction, to make any of these parts of separate components, alignment nodes 162 are designed into the components. The fan is also attached to the aircraft hull by an annular fan ring 160 and embedded into this ring is a system of spring-loaded pawls 159 to create a ratchet ring 169 effect for the hull attachment. This is to provide for the continuation of the turning of the hull 139 should the motor be turned off or if a condition of excessive pressure build-up should occur in the compression chamber 136.

Air from the compressed air chamber 136 is used to provide impulse to all of the thrusters. The flow of air supply to the thrusters is controlled by a system of servos and levers housed within the battery/motor compartment 142. Battery driven motors and servos are illustrated in this presentation because it is meant to show how the aircraft might be constructed in a small scale model such as might be used for military or rescue surveillance. This is not meant to restrict other applications that might be used for an aircraft designed for computer control or manned flight.

Figure 38:
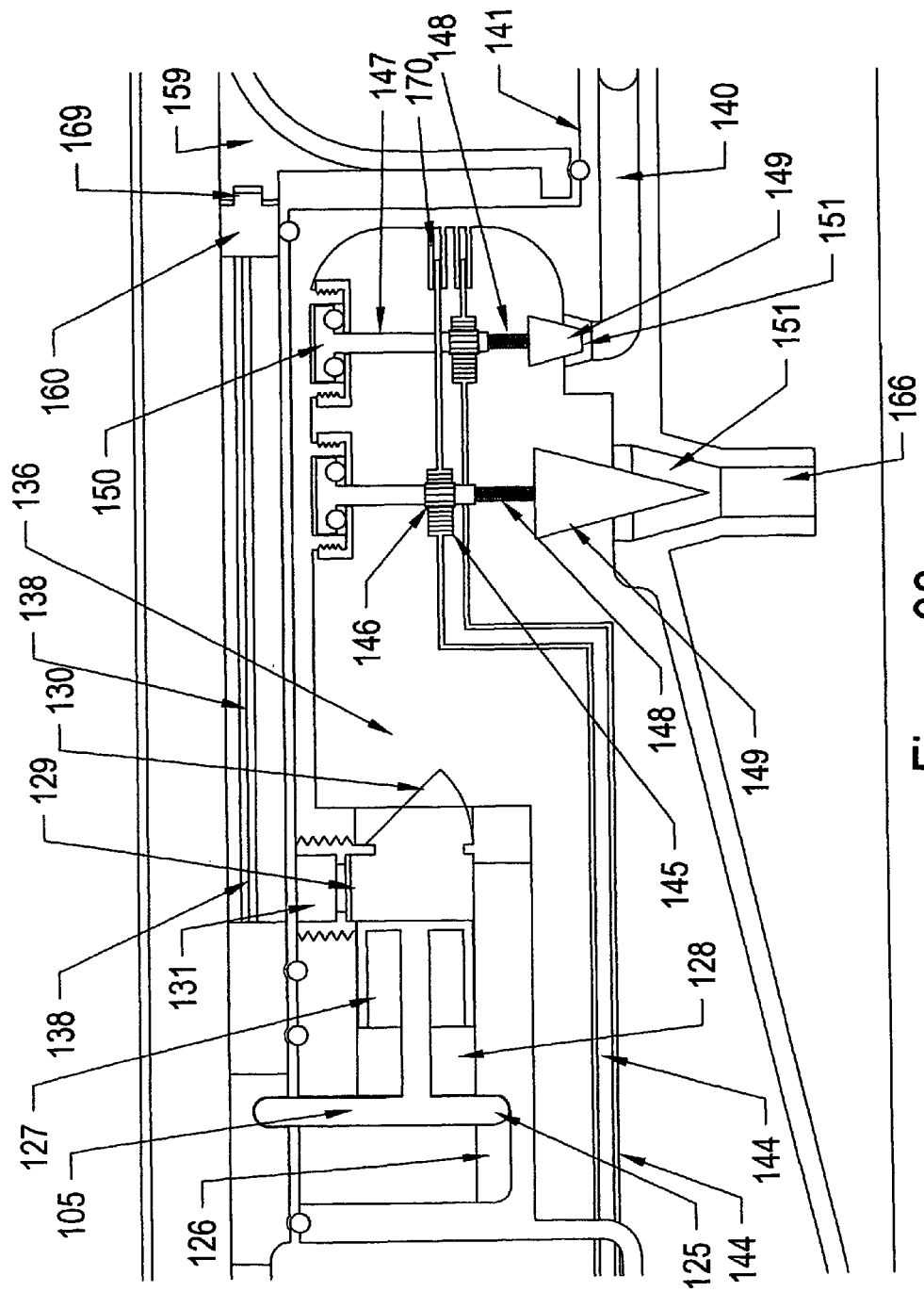
FIG. 38 is an enlarged front view section showing the needle valves of vertical thrust.

In this presentation, there are two applications of pressure release navigational controls. One configuration, shown in FIG. 39, calls for gate plates 143 which are attached to servo control rods 144 and are housed over the thruster openings. The free end of the servo control rods 144 rests on slotted supports 170 built into the main body of the aircraft. The servo protraction and retraction motions control the amount of opening and thereby the size of the aperture opening to the thrusters controlling how much air is released which then determines the amount of lift or stabilization exerted. Another configuration, as shown in FIG. 38, has the servo control rods 144 fitted with rack teeth 145 which mesh with exterior spur gear teeth 146 on a cylinder 147 containing interior threads. The cylinder 147 spins in a housing 150 fitted with ball bearings. When the servo control rods 144 protract or re-tract, the said cylinder 147 rotates and engages the exterior threads of the threaded rod 148 attached to a slotted needle nosed valve 149. An arm 193 attached to the aircraft body and extending into the slot of the needle nosed valve 149 prevents the closer from turning with the threaded rod engaged in the threaded valve thereby causing said valve 149 to move up and down in an open and closing movement. The raising and lowering of the said needle nosed valve either shuts off flow entirely or allows graduated air flow through the valve opening 151 thereby controlling the pressure release into the vertical lift thrusters.

Figure 30:
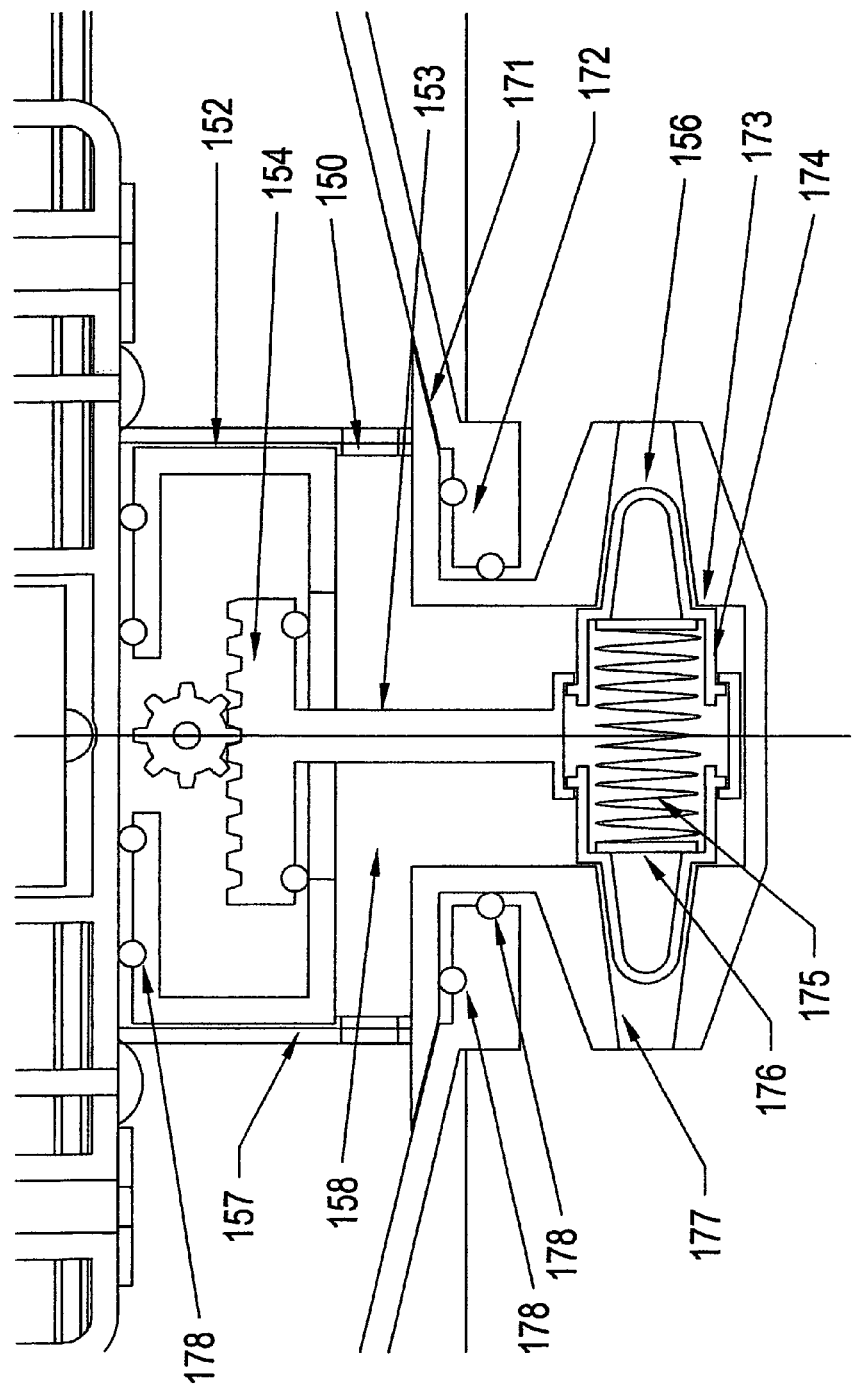
FIG. 30 is an enlarged section with both propulsion thrusters closed.
Figure 31:
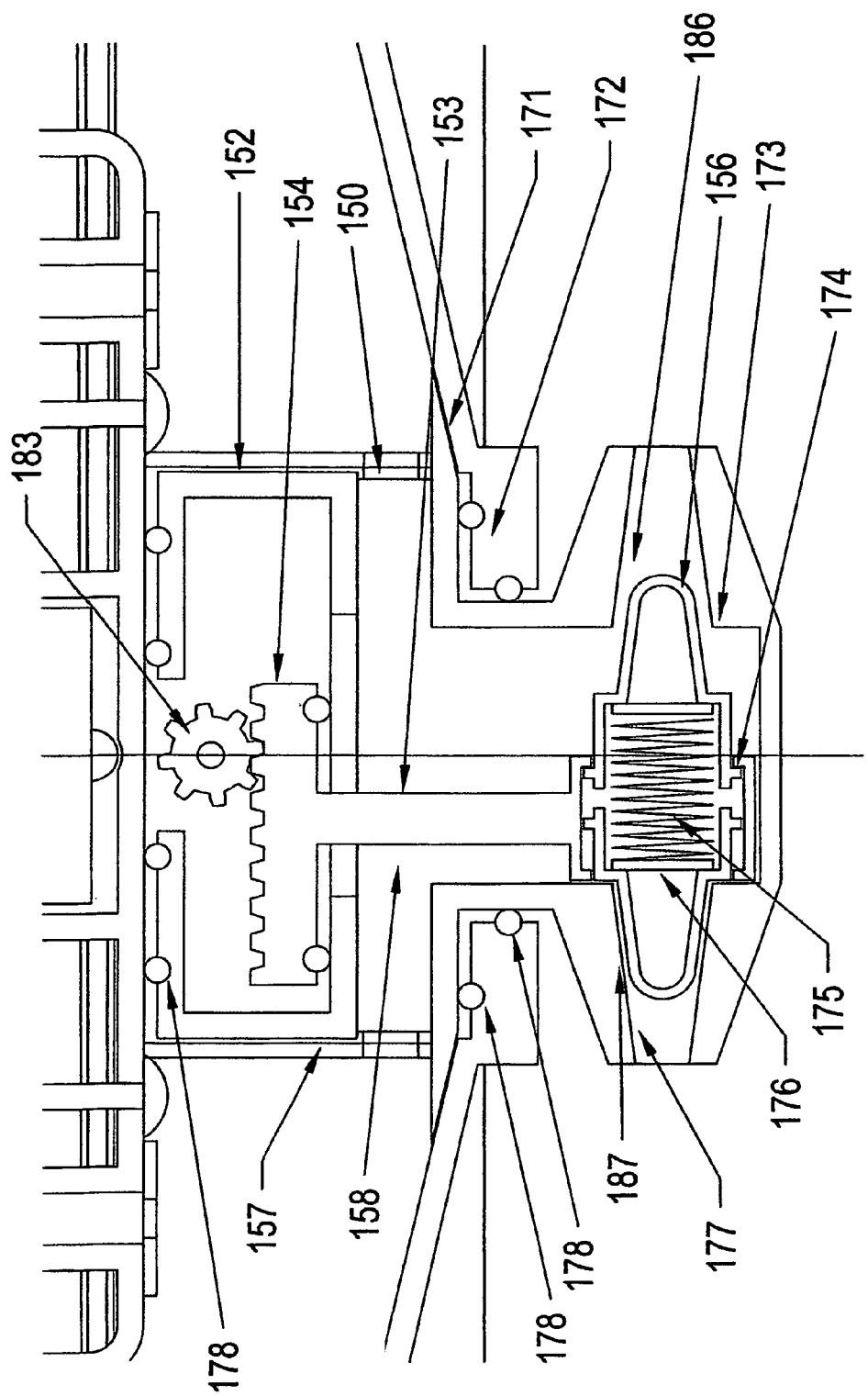
FIG. 31 is an enlarged section with one propulsion thruster open.

As shown in FIGS. 30 and 31, another swivel assembly 152 used for forward or rearward propulsion contains gears and bearings to permit rotation through 360 degrees. The assembly uses Teflon coated pressure seal 171 to provide rotation and prevent pressure seepage, and it rests on ball bearings 178 imbedded in a ledge 172 of the aircraft body. A rod 153 that on one end contains a rack 154, and rests on ball bearings is meshed to a rotary gear 183 that moves the rod back and forth, controls the position of the bottom tee-shaped piece on the other end of the rod that has two blunt nosed valve closers 156 that control the amount of forward and backward thrust. When the rod 153 is in the center, a neutral position, a closer spring 175 holds both blunt nosed closers against a spot-faced closer seal 173 because closer plates 176 are pressing against the interiors of each closer. When the rod 153 is off center 155, a drag edge 174 on the rod 153 pulls against a lip 185 on the blunt-nosed closer 156 causing the pressure seal to be opened and allowing air to escape. This provides direction to the impulse thrusters 181 based upon the direction that the swivel assembly 152 is pointing. The closer spring 175 allows for this action. A cylindrical damper 157 surrounding the swivel assembly 152 controls the total amount of air allowed into the propulsion chamber 158. Openings 150 in the swivel assembly duplicate the size of openings 184 in the cylindrical damper, and as the damper turns, the escaping pressure may be completely wide open or may be completely shut off.

Further, excess pressure buildup in the compressed air chamber 136 is released by a pressure relief valve assembly controlled by a pressure relief valve spring 180 that is designed to react to excessive pressure buildup in the compression chamber. Excess pressure enters through the pressure input valve vent 188, passes through the said spring 180, through the opening in the bottom of the slotted vent cage 190, and applies pressure to the top pressure plate 192 which is housed in the vent housing 191. As the pressure is increased, the said slotted vent cage reaches an altitude where the excess pressure is allowed to escape through the opening 189 into the area under the cover lid 133. The escaping pressure flowing against the cover lid may possibly create a slight additional lift, but more than likely, no change in elevation will occur.

The aircraft hull 139 is attached to the intake fan 132 with ratchet hull attachments 159 placed around the said fan perimeter while it also rests on bearing ledges 141 on top of the directional turning and stabilization thrusters 140. The entire assembly is attached to the cover lid 133 by assembly connectors 121 connecting the cover lid with the non-rotating main body of the aircraft.

Figure 28:
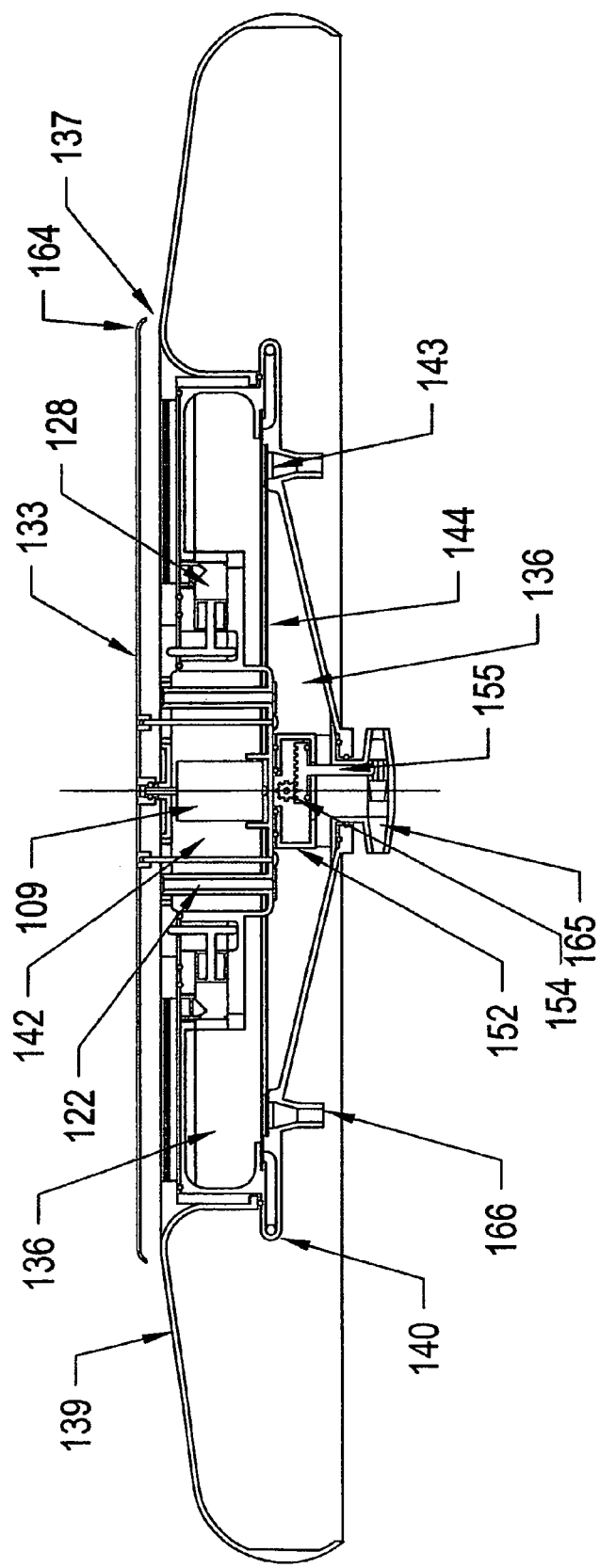
FIG. 28 is a full front view section showing the gate plates of the vehicle of FIG. 27.
Figure 29:
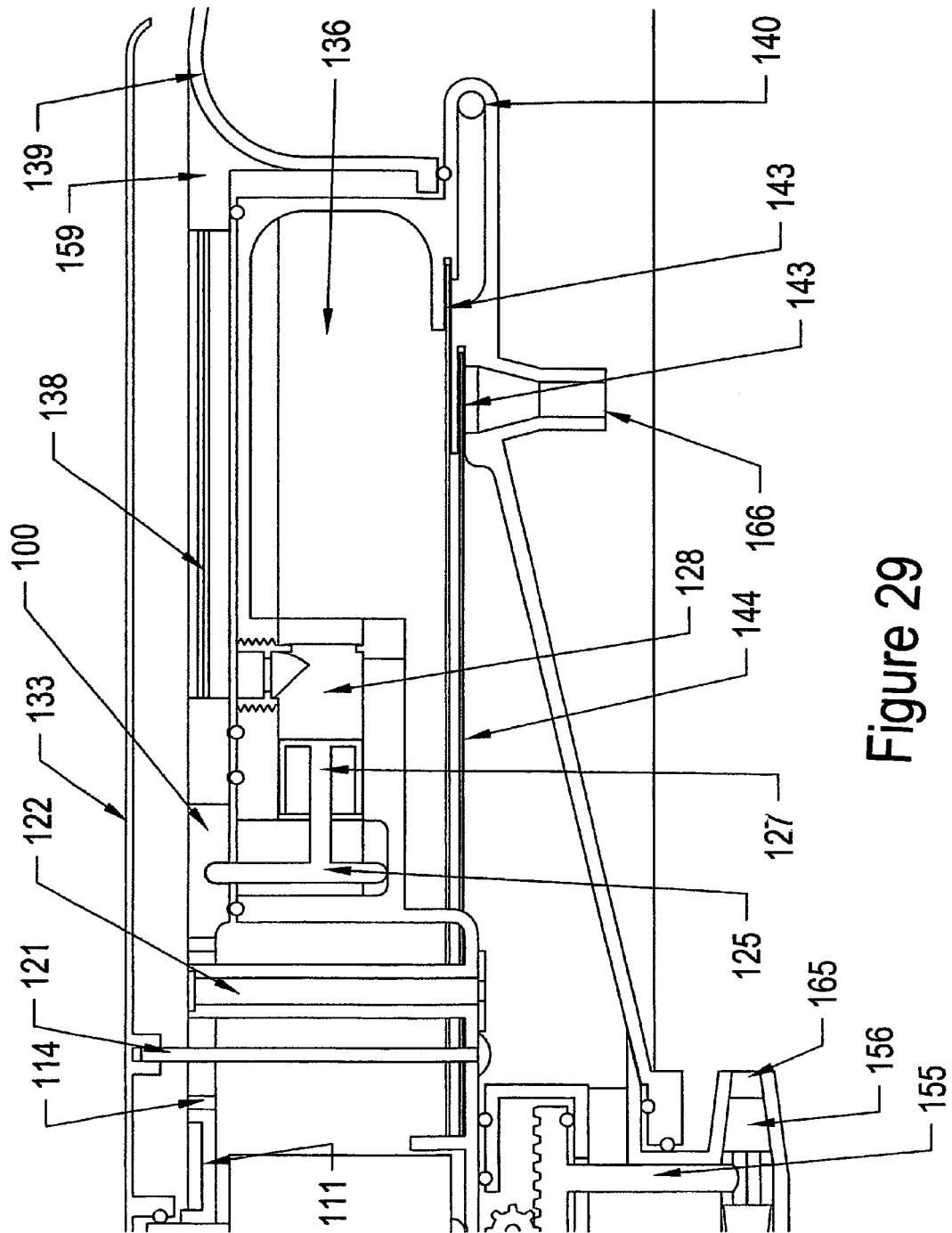
FIG. 29 is an enlarged front view section showing details of the gate plate.
Figure 42:
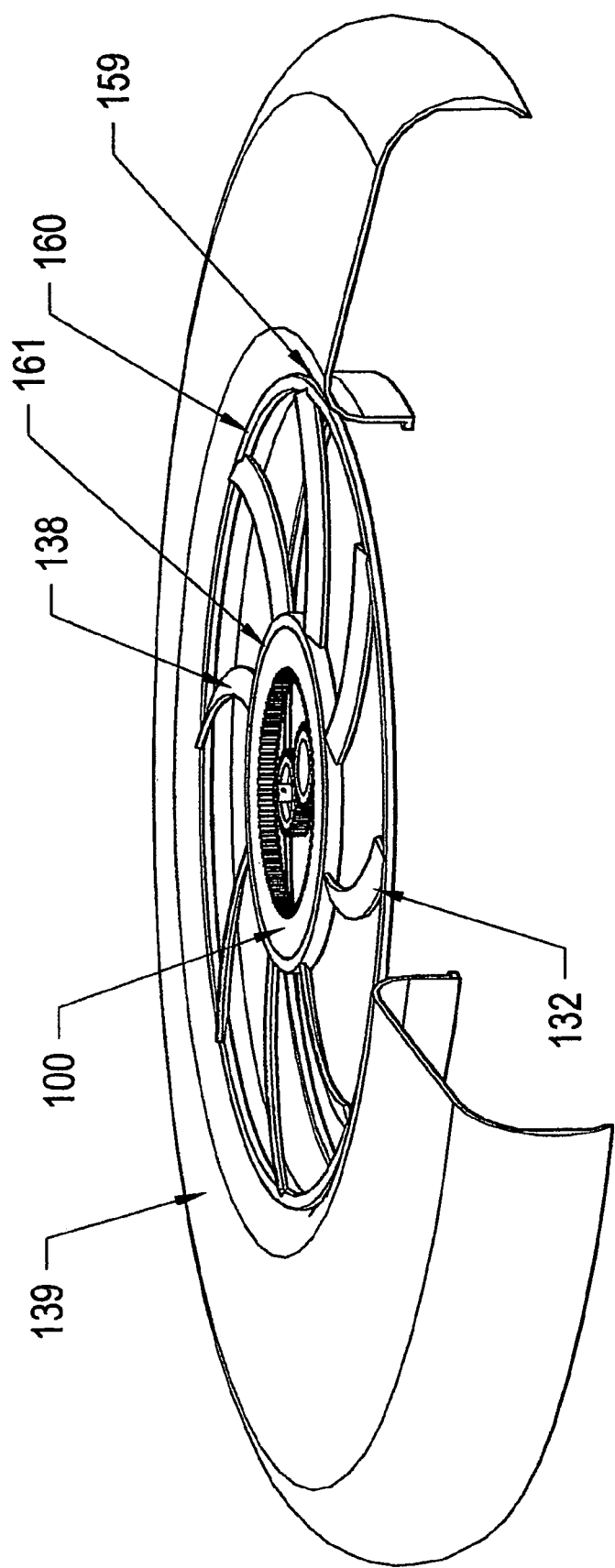
FIG. 42 is a section perspective of the fan, disc shaped hull and sinusoidal plate.
Figure 43:
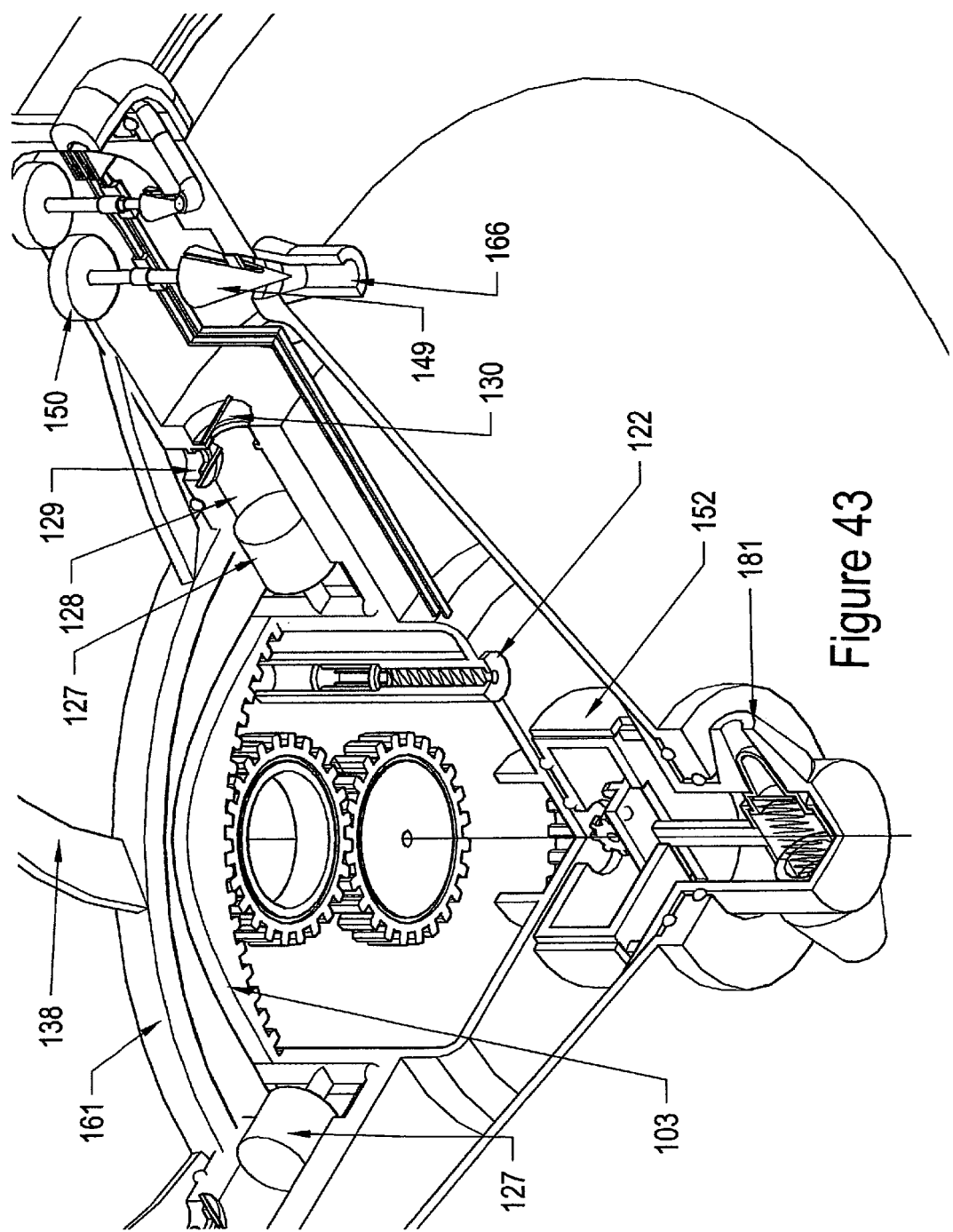
FIG. 43 is an underside perspective of the swivel propulsion and lift thrusters.
Figure 44:
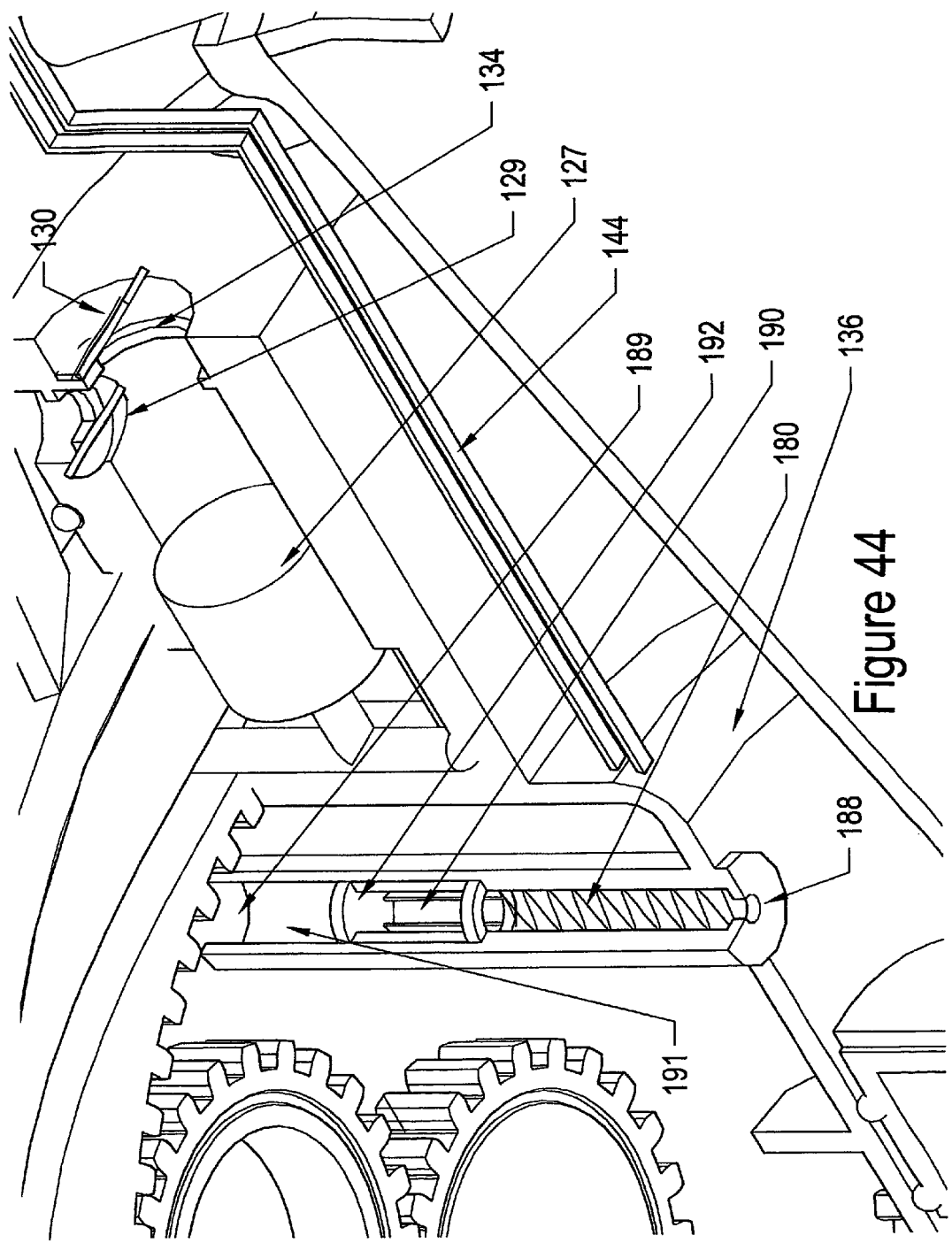
FIG. 44 is an enlarged view of the pressure relief valve and piston section.
Figure 45:
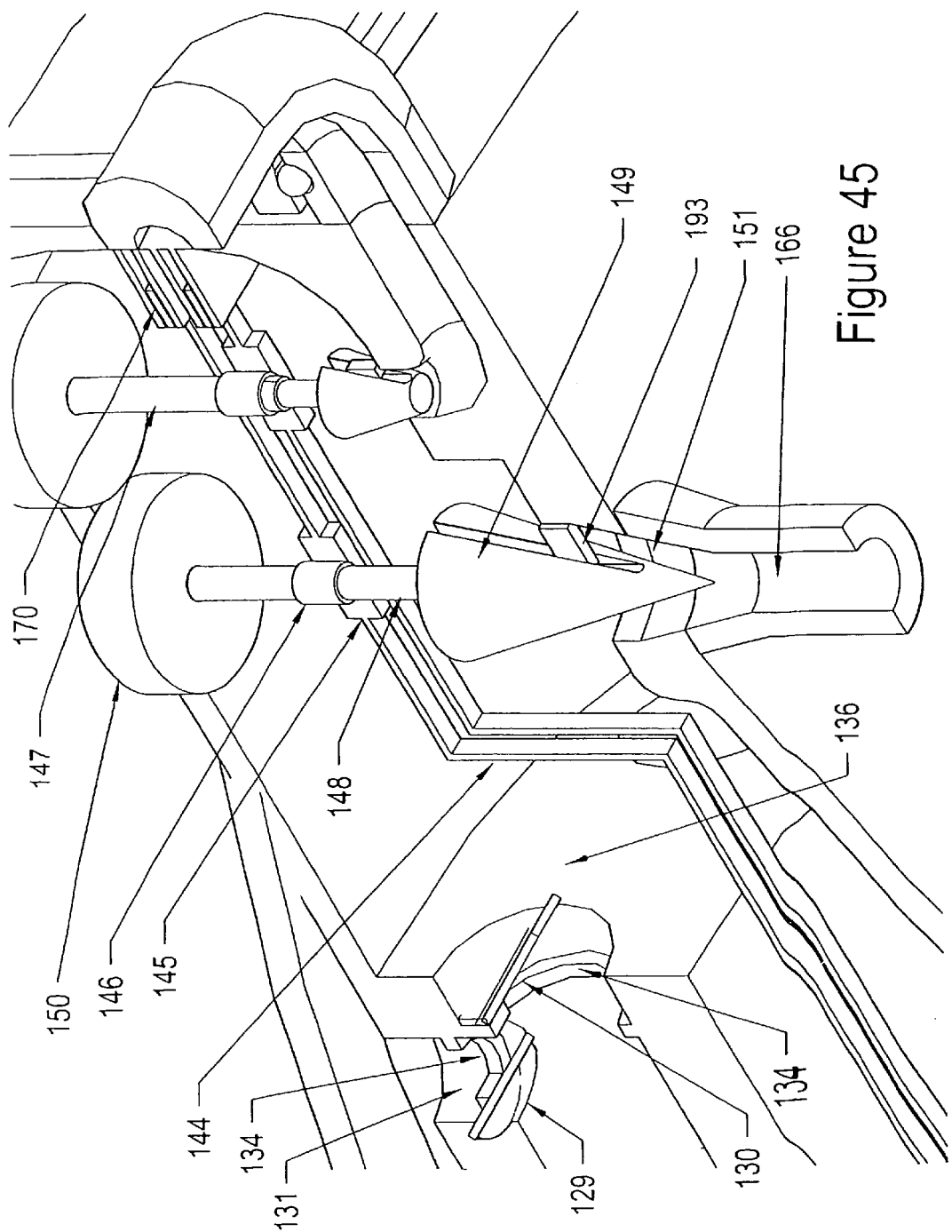
FIG. 45 is an underside enlarged view of the needle valve closers.
Figure 46:
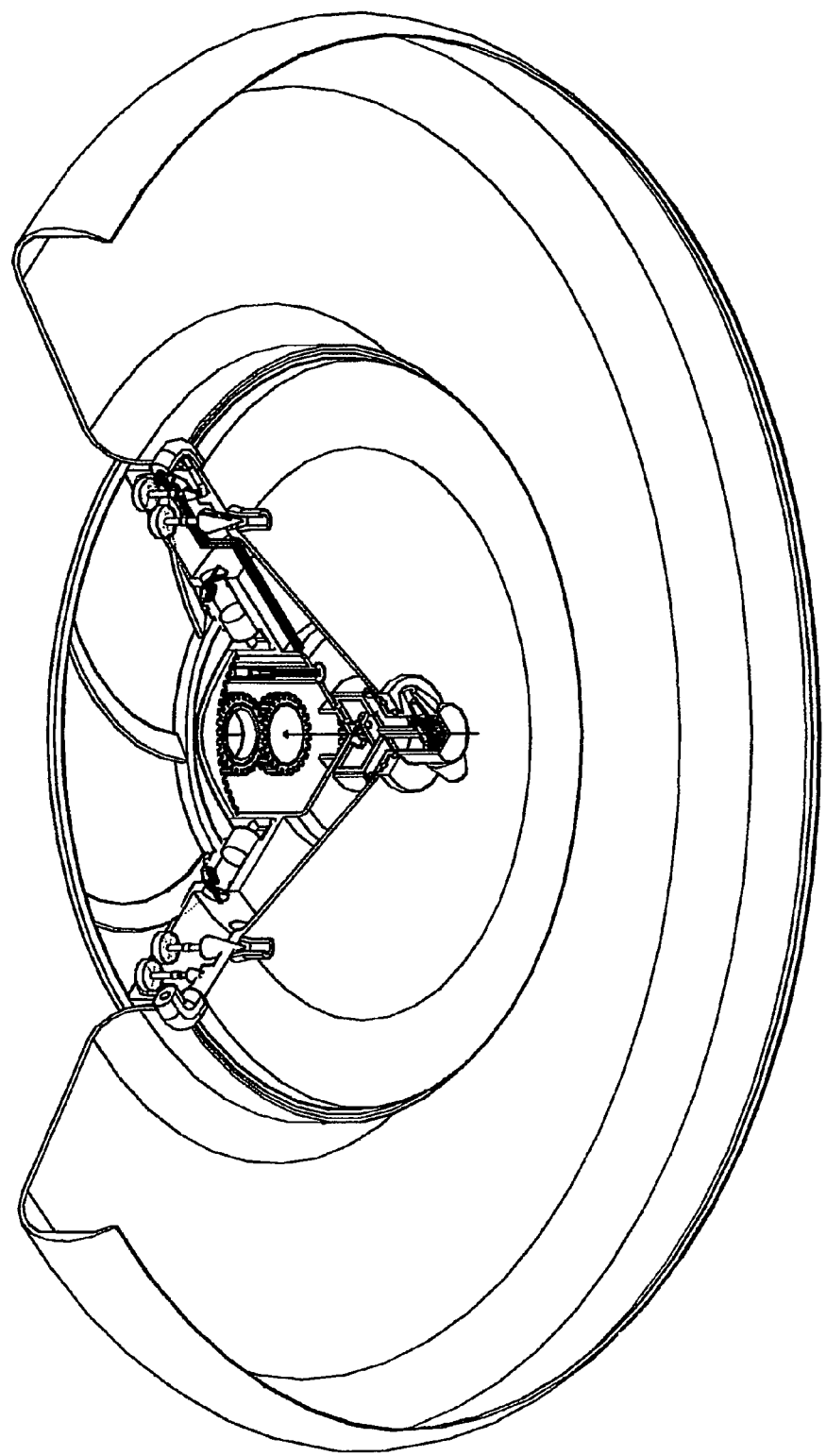
FIG. 46 is a view of the underside of the vehicle of FIG. 27.

Other elements illustrated in FIGS. 27-48 have not been described in great detail but function similar to analogous elements in FIGS. 1-16. For example, an open compression seal 186 and a closed compression seal 187 are illustrated in FIG. 31; a cover lip perimeter crimp 164 is shown in FIG. 27 as is a vertical lift thruster 166; FIG. 28 includes an illustration of the Impulse Thruster Chamber 165; Fan Attachment Ring 161 is shown in FIG. 42; and the bearing tower and motor housing 135 are shown in FIG. 39.

Both the embodiment with the sinusoidal ring 35 and in the embodiment with the sinusoidal plate 100 share a number of similar features. In both embodiments there are chambers with pistons whose movement is controlled in a sinusoidal manner. In other words each chamber has an end that can be used as a reference point from which the distance relative to the piston can be measured. Because of the motion of the sinusoidal plate 100 or ring 35, the piston is displaced in the chamber in a desired manner. In particular, at any snapshot of time the respective distances for every piston can be seen to vary in a sinusoidal pattern. Because the ring 35 or plate 100 is a rotating ring, the pistons continuously move and the sinusoidal pattern repeats. The number of complete cycles of a sinusoidal wave that are formed in the plate 100 or ring 35 can vary but three or four cycles of a sinusoidal wave are appropriate. One difference is that with the plate 100, the pistons move in a horizontal direction and with the ring 35, they move in a vertical direction.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but are to be accorded the full scope consistent with each claim's language, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A vertical take-off and landing aircraft, comprising:
   an outer saucer-shaped hull configured to rotate around a central axis of the aircraft thereby creating a gyroscopic effect for the aircraft;
   an inner stationary hull having a central axis substantially aligned with a central axis of the outer saucer-shaped hull and configured to be positioned within an annular opening of the outer saucer-shaped hull;
   a plurality of air passageways on a top of the inner stationary hull, the plurality of air passageways arranged in a circle by being equidistant from the central axis of the aircraft;
   a respective piston chamber and piston associated with each of the plurality of air passageways, each piston configured to move back and forth within its respective piston chamber such that it has a displacement distance within its respective piston chamber; and
   means for imparting motion onto the pistons such that the respective displacement distance associated with each of the pistons varies sinusoidally around the circle of air passageways.

2. The aircraft of claim 1, wherein the means for imparting motion include:
   a sinusoidal plate having a central axis substantially aligned with the inner stationary hull and configured to fit within the inner stationary;
   a motor configured to rotate the sinusoidal plate;
   a groove on a surface of the sinusoidal plate, wherein a distance of a center of the groove from the central axis of the sinusoidal plate varies in a sinusoidal manner; and
   a respective traveling arm coupled with each piston, each traveling arm having a first end adjacent the piston and a second end extending into the groove, and wherein rotation of the sinusoidal plate causes the respective traveling arm of associated with a particular piston to impart motion on that piston in a direction substantially perpendicular to the central axis of the inner hull.

3. The aircraft of claim 2, further comprising:
   a fan having a plurality of blades positioned between the outer saucer-shaped hull and the sinusoidal plate and wherein the fan is coupled with the sinusoidal plate so as to rotate concurrent with the sinusoidal plate.

4. The aircraft of claim 2, further comprising:
   a first plurality of cogs on an interior, annular cavity on the surface of the sinusoidal plate;
   an intermediary gear with a second plurality cogs in mechanical communication with the first plurality of cogs; and
   a drive gear coupled with the motor and having a third plurality of cogs, wherein rotation of the drive gear by the motor imparts rotation on the sinusoidal plate.

5. The aircraft of claim 4, further comprising:
   a compression chamber configured to receive air from the plurality of air passageways and exhaust the air through one or more thrusters.

6. The aircraft of claim 5, wherein the one or more thrusters include:
   one or more stabilization thrusters configured to exhaust air in a direction opposite that of a direction the aircraft is rotating.

7. The aircraft of claim 5, wherein the one or more thrusters include:
   one or more lift thrusters configured to exhaust air to thereby control an inclination of the aircraft.

8. The aircraft of claim 7, further comprising:
   a movable plate configured to cover a portion of at least one of the lift thrusters;
   a control arm configured to move the movable plate to a position which blocks a portion of the lift thruster to restrict an amount of air exhausted from the lift thruster.

9. The aircraft of claim 5, wherein at least one of the one or more thrusters is configurable to be in one of a plurality of different positions so as to control a direction in which the air is exhausted.

10. The aircraft of claim 5, wherein the one or more thrusters include:
    one or more propulsion thrusters configured to exhaust air to thereby control a direction of the aircraft.

11. The aircraft of claim 10 wherein at least one of the propulsion thrusters includes:
    a valve having a central axis and a first valve opening opposite a second valve opening, the first and second openings lying on an axis substantially perpendicular to the central axis of the valve;

a two-sided valve closer having a first side shaped to close the first valve opening and a second side shaped to close the second valve opening;

a rack and pinion gear arrangement configured to move the two-sided valve closer in a direction along the axis of the first and second valve openings to control an amount of air exhausted through the first and second valve openings.

12. The aircraft of claim 11, further comprising a spring that is biased to push the first closer towards the first valve opening and the second closer towards the second valve opening such the first and second openings are substantially closed concurrently.

13. The aircraft of claim 11, wherein the rack and pinion gearing arrangement is configured to move the two-sided valve closer so the first valve opening is substantially closed and the second valve opening is at least partially open.

14. The aircraft of claim 11, wherein the at least one propulsion thruster is swivable about an axis substantially parallel with the central axis of the outer saucer-shaped hull.

15. The aircraft of claim 2, further comprising:
a plurality of air foil propellers positioned on a top surface of the outer saucer-shaped hull and configured to be in a closed position or an open position.

16. The aircraft of claim 15, wherein in the closed position the air foil propellers resist descent of the aircraft and in the open position, the open position being adjustable such that an amount of openness controls an amount of lift acting on the aircraft.

17. The aircraft of claim 1, wherein a first weight of the outer saucer-shaped hull is more than a second weight of the inner stationary hull whereby rotation of the outer hull provides a gyroscopic stabilizing effect on the aircraft.

18. The aircraft of claim 17, wherein a circumference of the sinusoidal ring is an integer multiple of a wavelength at which the height of the sinusoidal ring varies.

19. The aircraft of claim 17, further comprising:
a plurality of bearings positioned between the inner stationary hull and the outer saucer-shaped hull.

20. The aircraft of claim 1, wherein the means for imparting motion includes:
a plurality of motors located between the outer saucer-shaped hull and the inner stationary hull and configured to rotate the outer saucer-shaped hull relative to the inner stationary hull; and wherein the pistons are positioned within the inner stationary hull and configured to travel substantially perpendicular to a top surface of the inner stationary hull so as to draw air into the aircraft; and a sinusoidal ring configured so that a height of a top surface of the ring varies in a sine-wave fashion around its perimeter, wherein the sinusoidal ring is in mechanical communication with the outer saucer-shaped hull such that rotation of the outer saucer-shaped hull results in rotation of the sinusoidal ring, and wherein the pistons are in mechanical communication with the top surface of the sinusoidal ring such that motion of each piston varies as the sinusoidal ring rotates.

\* \* \* \* \*